US007887409B2

(12) United States Patent
Baerlocher et al.

(10) Patent No.: US 7,887,409 B2
(45) Date of Patent: Feb. 15, 2011

(54) GAMING DEVICE HAVING GAME WITH PLAYER SELECTIONS AND AWARD POOLS

(75) Inventors: Anthony J. Baerlocher, Reno, NV (US); Lance R. Peterson, Reno, NV (US); Tonja M. Peterson, Reno, NV (US); Kelsy Grace, Reno, NV (US)

(73) Assignee: IGT, Reno, NV (US)

( * ) Notice: Subject to any disclaimer, the term of this patent is extended or adjusted under 35 U.S.C. 154(b) by 1374 days.

(21) Appl. No.: 10/953,829

(22) Filed: Sep. 29, 2004

(65) Prior Publication Data

US 2006/0084500 A1 Apr. 20, 2006

(51) Int. Cl.

*A63F 9/18* (2006.01)
*A63F 9/24* (2006.01)
*A63F 1/18* (2006.01)
*A63F 9/00* (2006.01)
*A63F 13/00* (2006.01)

(52) U.S. Cl. ............................. 463/20; 463/16; 463/17; 463/18; 463/19; 463/25; 463/9; 463/10; 273/142 B; 273/138.1

(58) Field of Classification Search ................... 463/21, 463/9–10, 20, 25, 16–17; 273/142 B, 138.1
See application file for complete search history.

(56) References Cited

U.S. PATENT DOCUMENTS 4,448,419 A 5/1984 Telnaes
4,582,324 A 4/1986 Koza et al.
4,618,150 A 10/1986 Kimura
4,624,459 A 11/1986 Kaufman
4,695,053 A 9/1987 Vazquez, Jr. et al.
4,991,848 A 2/1991 Greenwood et al.

(Continued)

FOREIGN PATENT DOCUMENTS

EP 0 874 337 A1 10/1998

(Continued)

OTHER PUBLICATIONS

Jeopardy! (NES) Game information; Release 1987, reviewed by Bloody_riven; printed from the Internet Jan. 11, 2010 from: <URL; http://www.consoleclassix.com/nes/jeopardy.html>.*

(Continued)

*Primary Examiner*—Melba Bumgarner
*Assistant Examiner*—Frank M Leiva
(74) *Attorney, Agent, or Firm*—K&L Gates LLP

(57) ABSTRACT

A gaming device includes a plurality of symbol groups which each include a plurality of symbols. In one embodiment, each of the symbols is associated with a probability of being generated. The gaming device includes a plurality of player selectable selections. The gaming device includes a plurality of outcome pools. Each pool includes the number of designated symbols which are generated for each selection. That is, each pool determines how many symbols will be generated for the indicated group for each selection. Each time a player picks one of the selections, the gaming device selects one of the pools. The gaming device generates the designated number of symbols associated with the picked selection which is determined by the selected pool. The gaming device provides the player an outcome or award, based at least in part, on the generated symbols.

52 Claims, 12 Drawing Sheets

U.S. PATENT DOCUMENTS 5,092,598 A 3/1992 Kamille
5,178,390 A 1/1993 Okada
5,205,555 A 4/1993 Hamano
5,407,200 A 4/1995 Zalabak
5,456,465 A 10/1995 Durham
5,524,888 A 6/1996 Heidel
5,536,016 A 7/1996 Thompson
5,542,669 A 8/1996 Charron et al.
5,560,603 A 10/1996 Seelig et al.
5,611,535 A 3/1997 Tiberio
5,707,286 A 1/1998 Carlson
5,711,525 A 1/1998 Breeding
5,769,716 A 6/1998 Saffari et al.
5,775,692 A 7/1998 Watts et al.
5,788,573 A 8/1998 Baerlocher et al.
5,823,874 A 10/1998 Adams
5,833,538 A 11/1998 Weiss
5,848,932 A 12/1998 Adams
5,851,148 A 12/1998 Brune et al.
5,855,514 A 1/1999 Kamille
5,873,781 A 2/1999 Keane
5,882,261 A 3/1999 Adams
5,911,418 A 6/1999 Adams
5,927,714 A 7/1999 Kaplan
5,947,820 A 9/1999 Morro et al.
5,951,397 A 9/1999 Dickinson
5,964,463 A 10/1999 Moore, Jr.
5,967,894 A 10/1999 Kinoshita et al.
5,980,384 A 11/1999 Barrie
5,984,781 A 11/1999 Sunaga
5,997,400 A 12/1999 Seelig et al.
6,004,207 A 12/1999 Wilson, Jr. et al.
6,015,346 A 1/2000 Bennett
6,019,369 A 2/2000 Nakagawa et al.
6,033,307 A 3/2000 Vancura
6,059,289 A 5/2000 Vancura
6,059,658 A 5/2000 Mangano et al.
6,062,980 A 5/2000 Luciano
6,089,976 A 7/2000 Schneider et al.
6,089,977 A 7/2000 Bennett
6,089,978 A 7/2000 Adams
6,093,102 A 7/2000 Bennett
6,102,798 A 8/2000 Bennett
6,120,031 A 9/2000 Adams
6,126,541 A 10/2000 Fuchs
6,126,542 A 10/2000 Fier
6,142,873 A 11/2000 Weiss et al.
6,142,874 A 11/2000 Kodachi et al.
6,142,875 A 11/2000 Kodachi et al.
6,146,273 A 11/2000 Olsen
6,155,925 A 12/2000 Giobbi et al.
6,159,095 A 12/2000 Frohm et al.
6,159,096 A 12/2000 Yoseloff
6,159,097 A 12/2000 Gura
6,159,098 A 12/2000 Slomiany et al.
6,168,523 B1 1/2001 Piechowiak et al.
6,174,233 B1 1/2001 Sunaga et al.
6,174,235 B1 1/2001 Walker et al.
6,186,894 B1 2/2001 Mayeroff
6,190,254 B1 2/2001 Bennett
6,190,255 B1 2/2001 Thomas et al.
6,203,429 B1 3/2001 Demar et al.
6,210,279 B1 4/2001 Dickinson
6,213,876 B1 4/2001 Moore, Jr.
6,220,959 B1 4/2001 Holmes, Jr. et al.
6,224,483 B1 5/2001 Mayeroff
6,231,442 B1 5/2001 Mayeroff
6,231,445 B1 5/2001 Acres
6,234,897 B1 5/2001 Frohm et al.
6,261,177 B1 7/2001 Bennett
6,270,412 B1 8/2001 Crawford et al.
6,299,165 B1 10/2001 Nagano
6,302,790 B1 10/2001 Brossard
6,305,686 B1 10/2001 Perrie et al.
6,309,300 B1 10/2001 Glavich
6,311,976 B1 11/2001 Yoseloff et al.
6,312,334 B1 * 11/2001 Yoseloff ...................... 463/25
6,315,664 B1 11/2001 Baerlocher et al.
6,319,123 B1 11/2001 Paludi
6,319,124 B1 11/2001 Baerlocher et al.
6,328,649 B1 12/2001 Randall et al.
6,336,860 B1 1/2002 Webb
6,346,043 B1 2/2002 Colin et al.
6,347,996 B1 2/2002 Gilmore et al.
6,375,187 B1 4/2002 Baerlocher
6,398,218 B1 6/2002 Vancura
6,464,582 B1 10/2002 Baerlocher et al.
6,494,785 B1 12/2002 Gerrard et al.
6,506,118 B1 1/2003 Baerlocher et al.
6,514,141 B1 2/2003 Kaminkow et al.
6,569,015 B1 5/2003 Baerlocher et al.
6,599,192 B1 7/2003 Baerlocher et al.
6,632,141 B2 10/2003 Webb et al.
6,648,754 B2 11/2003 Baerlocher et al.
6,692,355 B2 2/2004 Baerlocher et al.
6,719,632 B2 4/2004 Palmer et al.
6,722,981 B2 4/2004 Kaminkow et al.
6,722,982 B2 4/2004 Kaminkow et al.
6,776,711 B1 8/2004 Baerlocher
6,786,820 B2 9/2004 Gerrard et al.
6,793,579 B2 9/2004 Baerlocher et al.
6,796,905 B2 9/2004 Baerlocher et al.
6,808,452 B2 10/2004 Baerlocher et al.
6,811,483 B1 11/2004 Webb et al.
6,852,030 B2 2/2005 Baerlocher et al.
2003/0176215 A1 * 9/2003 Palmer et al. ................. 463/25
2005/0079911 A1 4/2005 Nakatsu

FOREIGN PATENT DOCUMENTS

EP 0 926 645 A2 6/1999
EP 0 944 030 A2 9/1999
EP 0 945 837 A2 9/1999
EP 0 981 119 A2 2/2000
EP 0 984 407 A2 3/2000
EP 0 984 408 A2 3/2000
EP 0 984 409 A2 3/2000
GB 2144644 A 3/1984
GB 2183882 A 6/1987
GB 2222712 A 3/1990
WO WO 97/032285 9/1997
WO WO 00/012186 3/2000
WO WO 02/078804 A1 10/2002

OTHER PUBLICATIONS

Addams Family article written by Strictly Slots, published in Jul. 2000.
Addams Family brochure, IGT, published in 2000.
Austin Powers brochure written by IGT, published in 2001.
Bonus Times article written by Strictly Slots, published in 2000.
Cash Box advertisement & article written by Anchor Games, Strictly Slots, published in 2000.
Description of Let's Make a Deal Television Show written by letsmakeadeal.com (2 pages), printed on Mar. 16, 2001.
Diamond Mine advertisement written by IGT, published prior to 2001.
Double Diamond game descriptions written by IGT printed on Mar. 21, 2001.
Easy Street advertisements and articles written by Casino Data Systems, published in 2000.
Fire and Fortune article written by Strictly Slots, published in 2001.
Good Times advertisement written by IGT, published in 1999.
Jackpot Party brochures and articles written by WMS Gaming, Inc., published in 1998, 2000 and 2001.

Jeopardy Video Slots advertisement written by IGT, published in 2000.
Jumble article, written by Strictly Slots, published in Dec. 2000.
Jumble description, written by WMS Gaming, Inc., printed from www.wmsgaming.com on Mar. 2001.
Let's Make a Deal written by geocities.com (10 pages), printed on Mar. 21, 2001.
Let's Make a Deal written by fortunecity.com (4 pages), printed on Mar. 21, 2001.
Let's Make a Deal written by Illinoislottery.com (1 page), printed on Mar. 21, 2001.
Let's Make a Deal geocities.com (2 pages), printed on Mar. 16, 2001.
Let's Make a Deal advertisement written by Shuffle Master and IGT, published in 2001.
Let's Make a Deal game advertisement written by Bally Gaming Systems, published in 1999.
Little Green Men advertisement and article written by IGT, Strictly Slots, published in 2000.
Marilyn Monroe brochure written by IGT, published in 2001.
MegaJackpots advertisement written by IGT, published in 1998.
Money Grab article written by Strictly Slots, published in Apr. 2001.
Money in the Bank advertisement written by Strictly Slots Konami, published in 2001.
Monopoly advertisements and articles written by WMS Gaming, Inc., Strictly Slots, published in 1998, 1999, 2000.
Monopoly Party Train article written by Strictly Slots, published in 2002.
On the Money article written by Strictly Slots, Casino Data Systems, published in Dec. 2000.
Polly & Roger brochure written by Anchor Games, published in 2000.
Price is Right—Showcase Show Down advertisement written by IGT, published in 2001.
Slots 2003 article written by Melissa Raimondi, published in Strictly Slots in Jan. 2003.
Smiling APE advertisement written by IGT, published prior to 2001.
South Park—Dodgeball advertisement written by IGT, published in 2000.
Take Your Pick brochure written by IGT/Anchor Games, published in 1999.
Take Your Pick article written by Strictly Slots, published in Mar. 2001.
The Deals of Let's Make a Deal written by fortunecity.com (2 pages), printed on Mar. 16, 2001.
The Official Let's Make a Deal Website written by Bally Gaming System Website, printed on Mar. 16, 2001.
Top Cat advertisement written by WMS Gaming, Inc., published prior to 2000.
Top Dollar brochure written by IGT, published in 1998.
Jeopardy!, published by Wikipedia, printed from website reported as archived on Sep. 22, 2004 (available at http://web.archive.org/web/20040928083750/http://en.wikipedia.org/wiki/Jeopardy!), 6 pages.
Basic Game Rules, written by Brian Dominy, printed from website reported as archived on Dec. 23, 2005 (available at http://web.archive.org/web/20051223122340/http://www.oddchange.com/jdoc/rules.html), 2 pages.

* cited by examiner

Pools Associated With Column 1 150

| | Contestant A | Contestant B | Contestant C | Chance of Being Employed |
|---|---|---|---|---|
| Pool 1 | 5 | 0 | 0 | 0% |
| Pool 2 | 4 | 1 | 0 | 0% |
| Pool 3 | 3 | 1 | 1 | 20% |
| Pool 4 | 1 | 3 | 1 | 40% |
| Pool 5 | 1 | 1 | 3 | 40% |

Pools Associated With Column 2 160

| | Contestant A | Contestant B | Contestant C | Chance of Being Employed |
|---|---|---|---|---|
| Pool 1 | 5 | 0 | 0 | 10% |
| Pool 2 | 4 | 1 | 0 | 10% |
| Pool 3 | 3 | 2 | 0 | 25% |
| Pool 4 | 3 | 1 | 1 | 30% |
| Pool 5 | 1 | 3 | 1 | 25% |

GAMING DEVICE HAVING GAME WITH PLAYER SELECTIONS AND AWARD POOLS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming devices provide enjoyment and excitement to players, in part, because they may ultimately lead to monetary awards for the players. Gaming devices also provide enjoyment and excitement to the players because they are fun to play. Bonus games, in particular, provide gaming device manufacturers with the opportunity to add enjoyment and excitement to that which is already expected from a base game of the gaming device. Bonus games provide extra awards to the player and enable the player to play a game that is different than the base game.

Bonus games are typically set up for the player to succeed. The player usually wins an award in a bonus game. In bonus game play, the goal is often to maximize the possible award. Winning, at least on some level, is therefore a standard component in gaming devices. Moreover, the payout percentage of any gaming device is ultimately set by the relevant gaming jurisdiction and gaming establishment, not the game designer.

A continuing need exists to provide gaming devices that issue awards in an exciting and enjoyable manner. In this respect, it is desirable to enable the player to have an impact on, or a hand in, determining their award. It is further desirable to increase the level of player interaction. Each of these features is desirable in a primary or secondary game.

SUMMARY OF THE INVENTION

The present invention relates to a gaming device which includes a game such as a bonus or secondary game having a plurality of symbol groups or categories of symbols and a plurality of player selectable selections. The gaming device indicates one of the symbol groups and enables a player to pick one of the selections to determine how many of the symbols to select or generate in the indicated symbol group. The game continues in this manner for a plurality or all of the displayed symbol groups or categories. The gaming device provides the player with an outcome based on the generated symbols in each category.

More specifically, in one embodiment, the gaming device includes a plurality of symbol groups which each include a plurality of symbols. The gaming device includes a plurality of player selectable selections and a plurality of outcome pools. Each pool includes a separate number of designated symbols which determines how many symbols are generated for each selection for the indicated symbol group. Each time a player picks one of the selections, the gaming device selects one of the pools. It should be appreciated that the gaming device may select the pool before or after the player selects a selection. The gaming device will generate the designated number of symbols associated with the picked selection which is determined by the selected pool. The gaming device provides the player an outcome or award, based at least in part, on the generated symbols.

In operation, the gaming device displays a plurality of symbol groups or categories which each include a plurality of symbols. In one embodiment, the symbols are values. The gaming device highlights, illuminates or indicates one of the displayed symbol groups or categories of values. The gaming device provides a plurality of selectable selections. The gaming device instructs and enables a player to pick one of the selections. The gaming device selects one of the pools to employ for the indicated column. After the player picks one of the selections, the gaming device determines how many values in the indicated symbol group to generate based on the selection picked by the player and the pool selected by the gaming device. The gaming device generates the designated number of values associated with the picked selection for the selected pool.

For example, the gaming device includes three selections, A, B, and C, and a plurality of symbol groups. In one embodiment, each of the symbol groups includes five values. The gaming device includes a plurality of pools. Each of the pools includes three designated numbers of values, and each designated number is associated with a selection. The selected pool determines how many symbols will be indicated in a designated column. In Pool 1, Selection A has a designated number of three values. That is, if Pool 1 is employed in the game for the indicated symbol group and the player picks Selection A, the gaming device generates three of the five values of the indicated symbol group. Selection B and Selection C each have a designated number of one. That is, when Pool 1 is employed in the game and the player picks Selection B or Selection C, the gaming device generates one of the values in the indicated symbol group. In this example, the player picks Selection A and the gaming device selects Pool 1. Therefore, the gaming device generates three of the five values in the indicated symbol group.

The gaming device generates the designated number of values in the indicated symbol group. In one embodiment, the gaming device randomly determines which values to generate. In one embodiment, the gaming device accumulates the generated values and displays the accumulated values to a player. The game continues and the gaming device highlights or indicates another symbol group. The gaming device instructs and enables the player to pick one of the selections. The selection may be the same selection previously picked or a different selection. The game continues in this manner until all or a certain number of the symbol groups have been indicated and played. In one embodiment, the gaming device provides the player with the accumulated amount or total of all the values indicated in the game.

In one embodiment, each of the symbols or values is associated with a probability of being generated. After the player picks one of the selections and the gaming device selects a pool, the gaming device uses the selected pool and the picked selection to determine how many values to generate in the indicated symbol group. The gaming device uses the probabilities to determine which of the values in the indicated symbol group to generate. In one embodiment, each time one of the values is indicated, the probabilities associated with each of the remaining values change because the gaming device must indicate a different value. In one embodiment, the probability of the generated value becomes zero.

For example, an indicated symbol group includes five symbols. A player picks a selection and the gaming device selects one of the pools to employ. Based on the picked selection and the selected pool, the gaming device determines to generate two of the symbols. Each of the five symbols is associated with or has a probability of being generated or indicated. The gaming device determines which symbol to generate based on the probabilities associated with each of the symbols. The gaming device generates one of the symbols based on the associated probabilities. The probabilities of each of the remaining selections change because the generated symbol may not be generated again. The gaming device generates the next symbol based on the probabilities. Each time the gaming device generates one of the symbols in the symbol group, the probabilities of the remaining, unselected symbols change. The gaming device generates the designated number of symbols determined by the pool and the player selection.

In another embodiment, the symbols in each group are each associated with a probability. In this embodiment, when one of the symbols in that group is indicated, the probabilities associated with the non-indicated symbols do not change. Rather the ratio of the probabilities changes. The probability associated with the indicated section is excluded from the ratio of the probabilities, thus changing the probability of each of the non-generated symbols. For example, a symbol group can include four symbols. Initially each of the sections has a 25/100 or 25% probability of being generated. When one of the symbols is generated, the probability associated with the generated is taken out of the denominator of the ratio. Thus, when one of the symbols is generated, each of the other symbols has a 25/75 probability of being indicated. Likewise, after two of the symbols have been generated each of the two remaining symbols has a 25/50 probability of being generated. It should be appreciated that any other suitable method of determining which symbols to generate may be employed in accordance with the present invention.

In one embodiment, the probabilities associated with each symbol are associated with the awards. In one embodiment, smaller values or smaller awards have a higher probability of being generated than larger awards. In one embodiment, the probabilities are randomly determined. In another embodiment, as the values increase the probability of being generated associated with each of the values decrease. In one embodiment, the probabilities of generating a higher award increase after more of the symbol groups are played are indicated.

In one embodiment, the gaming device indicates or illuminates a new symbol group when the designated number of symbols or values have been indicated or awarded for that symbol group. In one embodiment, after a selection is picked, all of the selections in the indicated symbol group the player will receive for that symbol group are indicated, thereby completing that group of symbols. In one embodiment, the symbol groups include a plurality of numerical values and other symbols. The other symbols are associated with functions of the game such as indicating a new symbol group, changing the values of the displayed symbols or changing the values of the accumulated award. It should be appreciated that the symbols can be displayed in any suitable format, arrangement or combination. It should be appreciated that the symbols may be any suitable type of symbol.

In another embodiment, the gaming device selects one of the pools and then randomly associates the values in the pool with each of the contestants. In one such embodiment, each value in the pool is individually associated with one of the contestants. The gaming device then generates the value randomly associated with the selection picked by the player.

In one embodiment, each of the symbol groups is associated with a plurality of pools. In one embodiment, the designated numbers of each of the pools is equal to the total number of symbols of the associated symbol group. That is, if the indicated symbol group has five symbols, the sum of all the numbers in each of the pools associated with that symbol group is five. The highest designated number associated with any of the selections is limited to the number of symbols in the indicated or displayed symbol group. In one embodiment, the symbol groups have the same number of symbols. In another embodiment, a plurality of the symbol groups have a different number of symbols.

In one embodiment, the gaming machine provides the player the same number of picks as there are symbol groups. In one embodiment, the gaming device provides the player with the accumulated amount or total of all the values indicated in the game. In another embodiment, each of the selections has a separate accumulated total. That is, each time one of the selections is selected, the symbols or values are indicated for that selection. In this embodiment, the gaming device awards the player one or more of the totals for the selections. In another embodiment, the gaming device provides the player with an award based, at least in part, on the accumulated value of all the indicated selections.

In one embodiment, the gaming machine provides the player the same number of picks as there are symbol groups. In one embodiment, the gaming device accumulates the indicated symbols, designated symbols or the provided symbols. In one embodiment, the gaming device provides the player with the accumulated amount or total of all the values indicated in the game. In another embodiment, each of the selections has a separate accumulated total. That is, each time one of the selections is selected, the symbols or values are indicated for that selection. In this embodiment, the gaming device awards the player one or more of the totals for the selections. In another embodiment, the gaming device provides the player with an award based, at least in part, on the accumulated value of all the indicated selections.

In one embodiment of the present invention, the game includes two segments. The first segment of the game results in an initial or first award amount. The second segment of the game enables the player to wager all, part or none of the first amount. The amount the player chooses to wager is the wager amount and the other part of the first award amount is the saved award amount. The game includes a plurality of masked player selectable selections which are associated with modifiers. After the player chooses the wager amount, the gaming device enables the player to select one of the selections to determine a modifier. After the player picks one of the selections, the gaming device modifies the wager amount by the award modifier associated with the picked selection. This amount is the second award amount.

In another embodiment, the game includes three segments. In one embodiment, the gaming device awards the player an outcome which includes the saved award amount and the second award amount. In another embodiment, the gaming device initiates a third game or another game segment after the modification of the wager amount. The results of this game determine if the player will win or lose the second wager amount. If the player wins the game, the gaming device provides the player an outcome which includes the saved award amount and the second award amount. In one embodiment, if the player loses the game, the gaming device provides the player with an outcome of the saved award amount.

It is an advantage for a gaming device to build a plurality of potential awards for the player and enables the player to wager some, all or none of an award offer.

Another advantage of the present invention is to provide a gaming device which enables a player to choose a selection which determines how many symbols in a symbol group will be awarded to player.

It is a further advantage of the present invention to provide a gaming device which enables a player to play a multi-segment game to build an accumulated award.

It is a further advantage of the present invention to provide a gaming device which includes symbols that enable a player to play one or more additional game segments.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
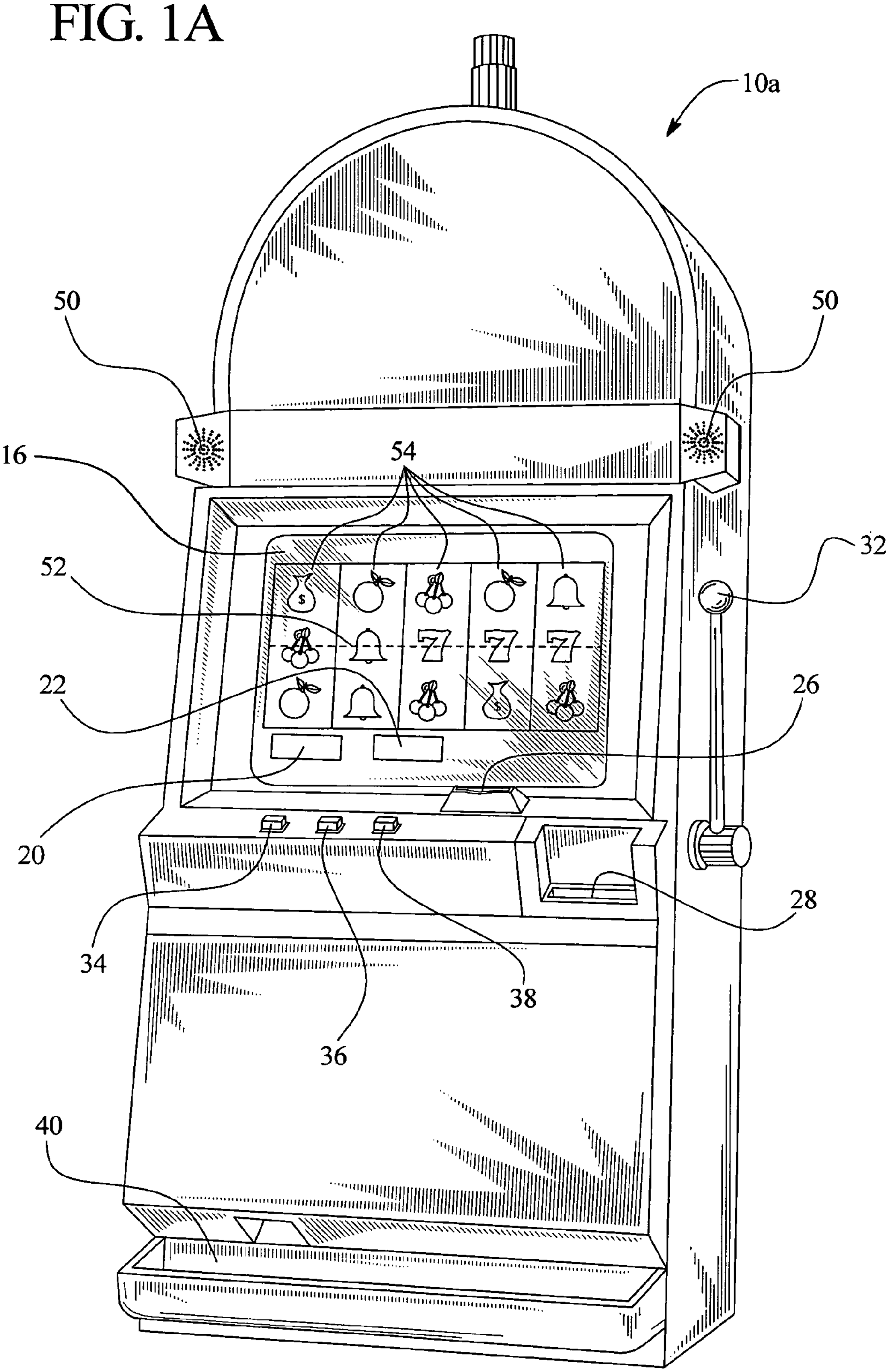
FIG. 1A is a front-side perspective view of one embodiment of the gaming device of the present invention.
Figure 1B:
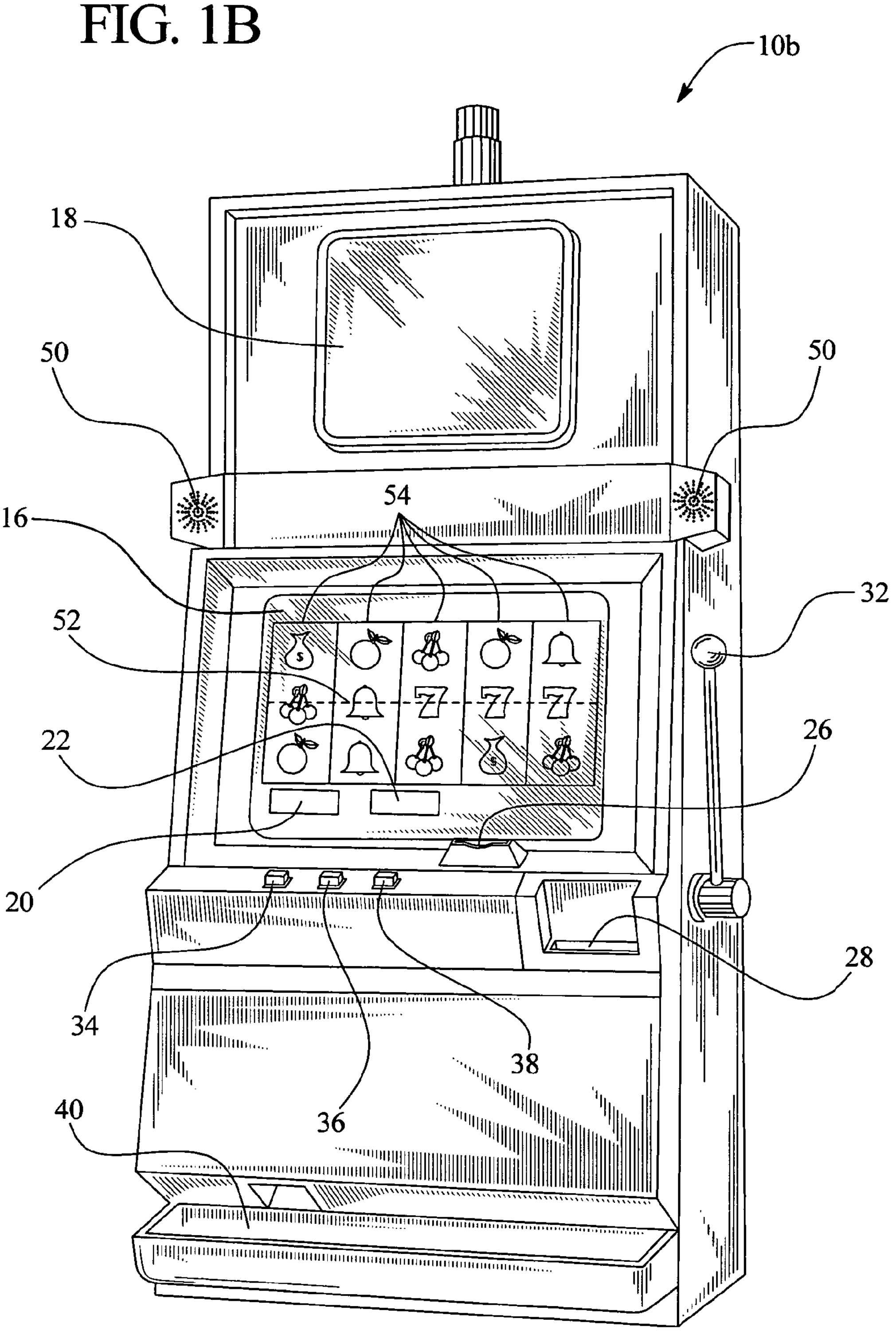
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
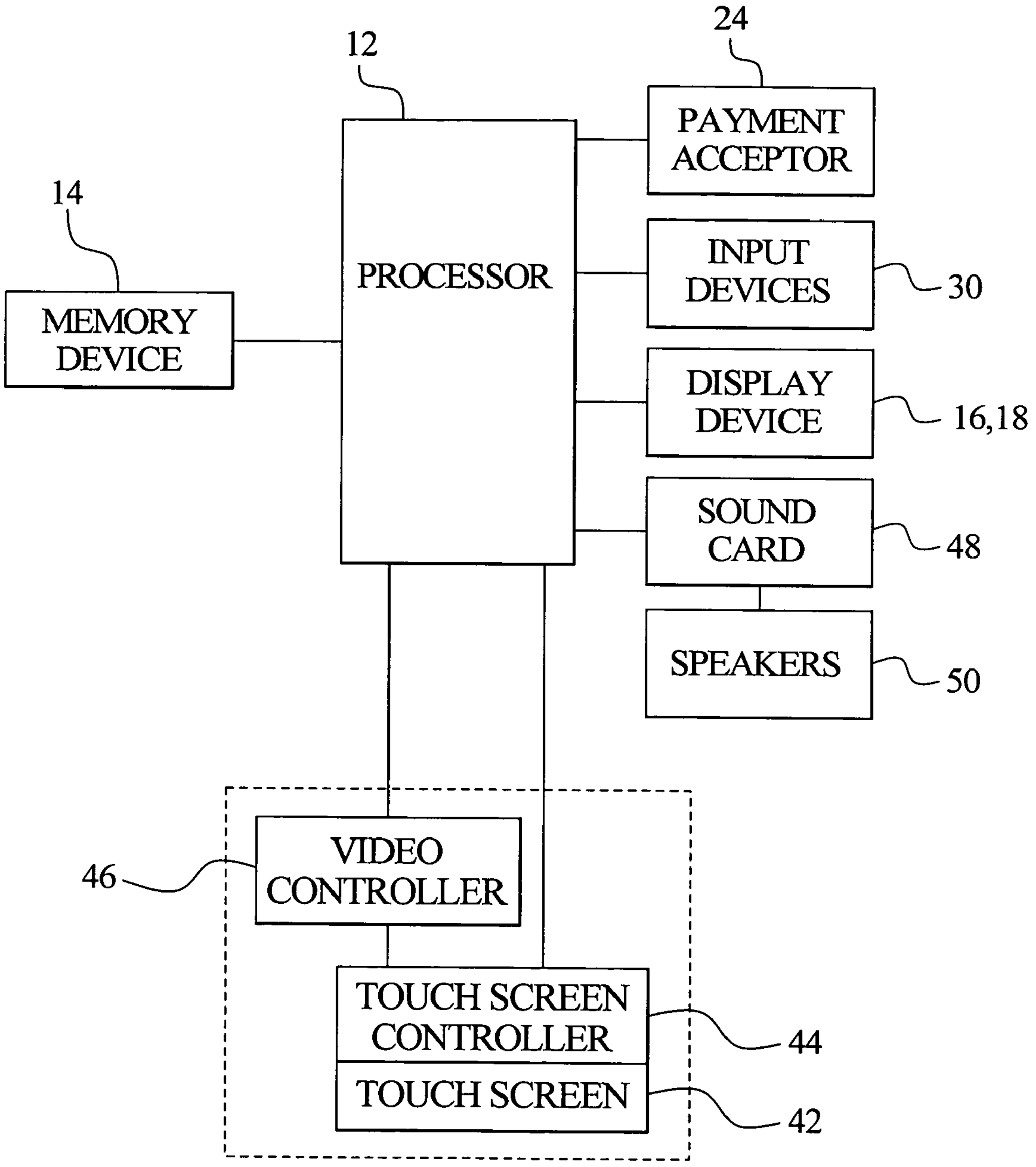
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming devices includes a credit display 20 which displays a player's current number of credits, cash, account balance or the equivalent. In one embodiment, as seen in FIGS. 1A and 1B, the gaming device includes at least one accumulation meter, 122*a*-122*e*. In one embodiment, the gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
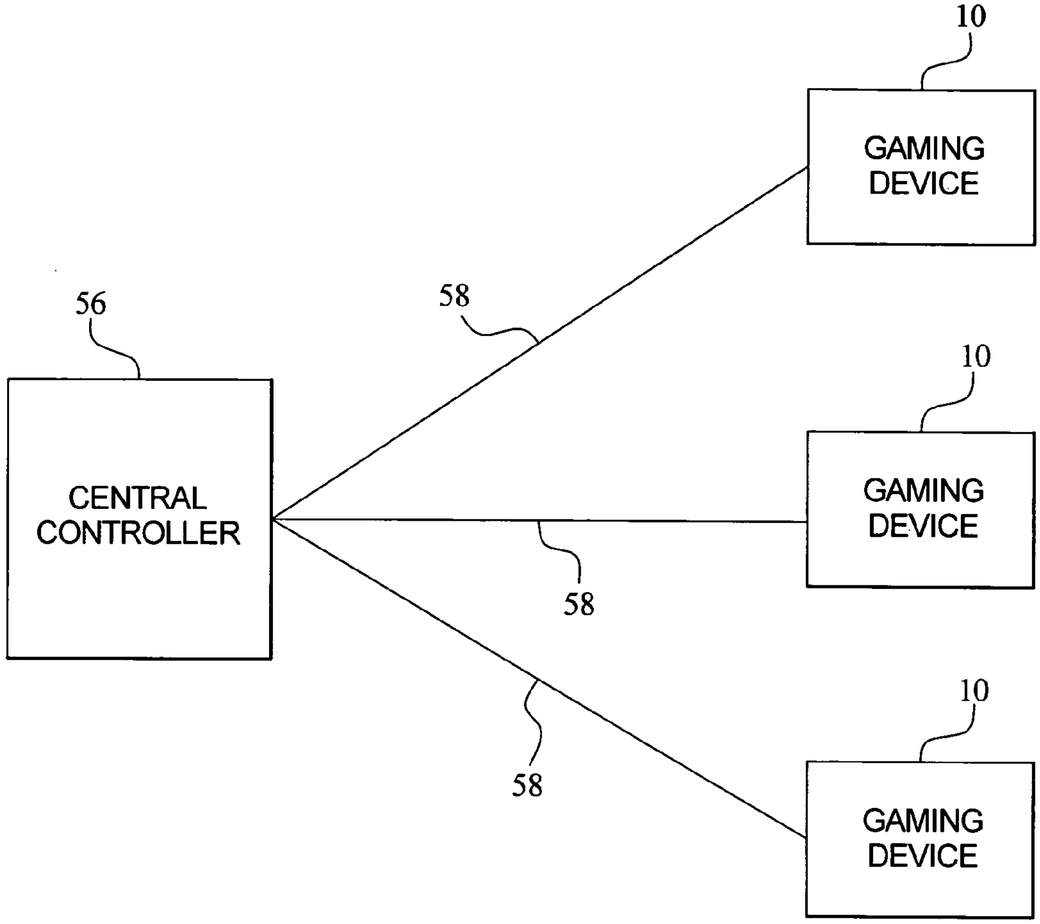
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

The accumulation game of the present invention can be provided to the player as a primary or base game or as a secondary or bonus game. If the accumulation game is provided as a secondary game, then the gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

If the game of the present invention is incorporated as a primary or base game, then in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

If the game of the present invention is incorporated as a primary or base game or as a secondary or bonus game, the accumulation game includes one or more paylines 52 as illustrated in FIGS. 1A and 1B. The paylines may be horizontal, vertical, circular, diagonal, angled or any combination thereof. In one embodiment, the gaming device displays at least one and preferably a plurality of reels 54, such as three to six reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In one embodiment, if the reels 54 are in video form, the plurality of simulated video reels 54 are displayed on one or more of the display devices as described above. Each reel 54 displays a plurality of indicia or symbols such as bells, hearts, fruits, numbers, letters, bars or other images which preferably correspond to a theme associated with the gaming device.

Game Play

Figure 3:
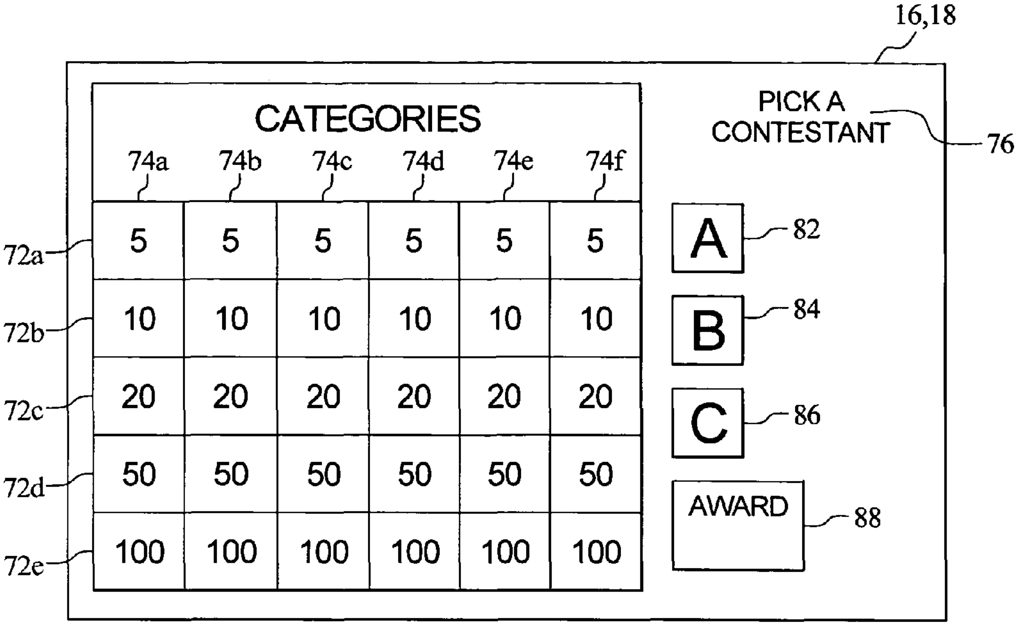
FIG. 3 is a front elevation view of a display device having one embodiment of an initial screen of the present invention.

Referring now to FIG. 3, in one embodiment, the symbol groups are categories which each include a plurality of numerical values. One embodiment of the game of the present invention as seen by the player is displayed in FIG. 3. FIG. 3 shows a grid labeled "categories." In one embodiment, the game operates in conjunction with the theme of the Jeopardy™ game show. The categories grid corresponds to the categories of answers displayed to the contestants playing the Jeopardy™ game. The grid includes a plurality of value levels 72*a* to 72*e* and a plurality of columns 74*a* to 74*f*, wherein the columns would correspond to different subject matter categories in the Jeopardy™ game. It should be appreciated that while the illustrated embodiment shows the present invention on a video display 16 and 18. It should be appreciated that the display of the present invention may be any suitable display such as a mechanical display. One embodiment of the present invention employs a mechanical display that illuminates or otherwise indicates the value levels. In one video or mechanical embodiment, the gaming device includes a plurality of different grids wherein the different grids include different value levels or different values such as single Jeopardy in the illustrated embodiment or Double Jeopardy, not illustrated.

In one embodiment, the symbols are numerical values which are displayed on a grid or board from lowest to highest starting from the top. In one embodiment, the first value of a column that is generated does not have to be the lowest value in the column. In one embodiment, every subsequent value generated from that column is greater than the first value generated. In one embodiment, a value from a first row must be selected before a value in the second row of the same column is selected, and so on. Here, the selections are associated or represent contestants on a game show accumulated awards for the contestants build incrementally. If a row of values is filled, the values of that row can no longer be generated.

In the illustrated embodiment, value levels 72*a* to 72*e* each include the same value in each column 74*a* to 74*f*. For example, each of the values of the different columns associated with the value level 72*a* is the value five, each of the values of the columns 74*a* to 74*f* associated with the value level 72*d* includes the value fifty, and each of the values of the columns 74*a* to 74*f* associated with the value level 72*e* includes the value one hundred. It should be appreciated that each of the value levels could have different values for each of the columns. Additionally, the symbols could be modifiers, terminators, free spins or any other suitable functional game symbol. Alternatively, one or more or all of the value levels could include different values for the different columns 74*a* to 74*f*. In that latter case, the range of values on the average value increases sequentially from level 72*a* to 72*e*.

In this embodiment, the player selectable selections represent contestants. FIG. 3 displays three contestants, Contestant A 82, Contestant B 84 and Contestant C 86, which respectively correspond to indicia "A", "B" and "C" in the illustrated screens. Contestant A 82, Contestant B 84 and Contestant C 86 are player selectable selections. This embodiment includes three player selectable selections, however, any suitable number of selections may be implemented in accordance with the present invention. In one embodiment, Contestant A 82, Contestant B and Contestant C 86 are each areas of the display device 16 or 18 that operate in conjunction with a touch screen 42 to send discrete inputs to a processor 12 when touched by a player 90. In an alternative embodiment, one, or more or all of the contestant selections 82, 84 and 86 is an electromechanical input device 30 provided elsewhere on the cabinet of gaming device 10. The electromechanical inputs 30 also send discrete signals to the processor 12, indicating a choice by a player 90. Eventually, the player receives an award which is displayed in award meter 88.

Figure 4:
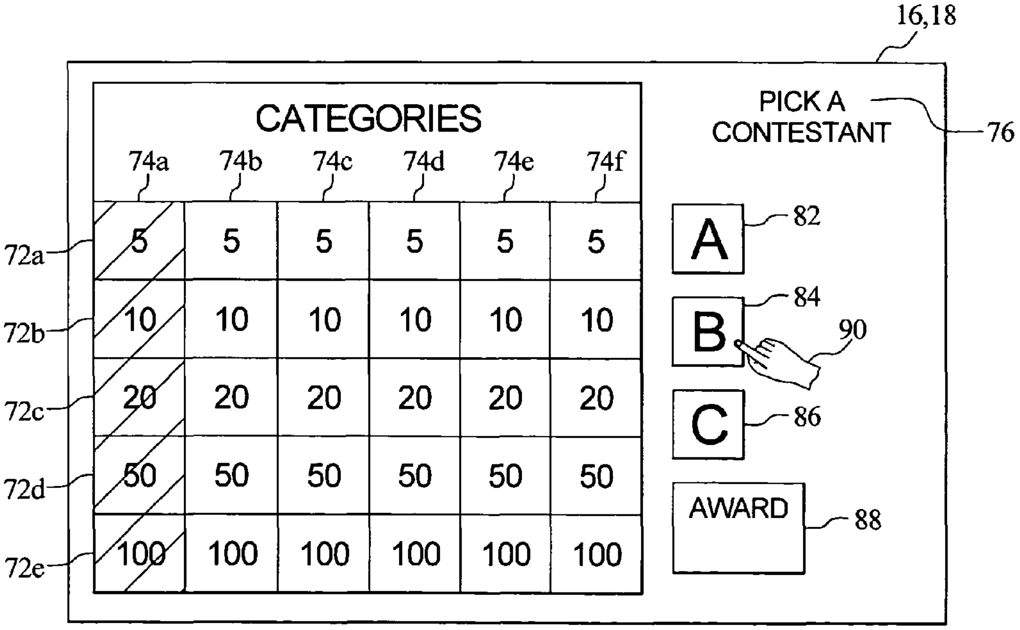
FIG. 4 is an elevation view of a display device illustrating how the gaming device indicates a column and enables the player to pick a contestant for the indicated column.

As illustrated in FIG. 4, upon a triggering event, the gaming device 10 illuminates or indicates one of the columns 74*a* and displays a message 76 to the player prompting the player to "pick a contestant." The player 90 in response picks Contestant B 84.

Figures 5, 6:
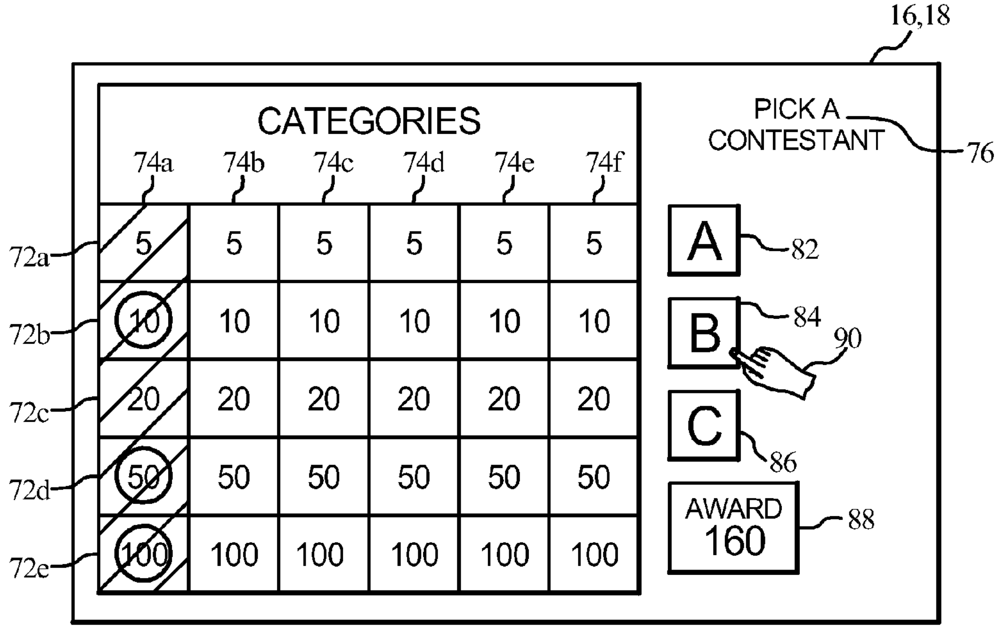
FIG. 5 is a table illustrating how in one embodiment of the present invention, the gaming device chooses from a plurality of pools to determine the outcome of the first segment of the game for each contestant.
FIG. 6 is an elevation view of a display device illustrating the player the results of the picked contestant.

The gaming device includes a plurality of outcome pools. As illustrated in the table of FIG. 5, each of the pools includes a designated number of values or picks that correspond to each contestant. That is, each pool designates how many values will be generated for the indicated column for each contestant. In the illustrated embodiment, each of the numbers of the pools are each associated with a contestant. However, in another embodiment, the gaming device randomly associates the numbers of the selected award pool with the selections. It should be appreciated that the gaming device may determine how many selections to indicate with the award pools in any suitable manner. In one embodiment, each of the pools is associated with a probability of being employed. In one embodiment, the probabilities associated with each pool change when a new column is indicated.

For example, the table 150 of FIG. 5 displays five pools. Pool 1 is displayed in the second row of the table 150. In one embodiment, each of the columns includes five values. For Pool 1, Contestant A has a designated number of five values. That is, if a player picks Contestant A and the gaming device employs Pool 1, the gaming device generates all five of the values in the column which is being played. Contestant B and Contestant C are each associated with or have a designated number of zero values. That is, when Pool 1 is employed in the game, if the player picks Contestant B or Contestant C, the gaming device will not generate any values for that column. The chance of Pool 1 being employed is 0% in this example. For the column being played, Pool 1 will not be employed. This arrangement guarantees that the player, no matter which selection picked in the first group or column, will receive at least one award. The results of Pool 2 are illustrated in the next row. For Pool 2, picking Contestant A generates or indicates four of the values of the indicated column. That is, when Pool 2 is employed in the game and the player picks Contestant A, the game generates four of the five values of the indicated column. In Pool 2, Contestant B is associated with one of the values and Contestant C is associated with zero of the five values. Pool 2 also is associated with a 0% chance or probability of being employed. Pool 3 includes the designated number of three values for Contestant A and two values for Contestant B. Contestant C is associated with zero of the five values. Pool 3 has a 20% chance of being employed in the game. In Pool 4, Contestant A is associated with one of the values; Contestant B is associated with one of the values and Contestant C is associated with one of the values. Pool 4 has a 40% chance of being employed. In Pool 5, Contestant A is associated with two of the values, Contestant B is associated with two of the values and Contestant C is associated with one of the values. Pool 5 has a 40% chance of being employed.

As illustrated in FIG. 4, the player picked Contestant B. In this example, the gaming device employs Pool 4 which has a 40% chance of being selected. Pool 4 designates three values to be indicated for Contestant B.

As illustrated in FIG. 6, the gaming device indicates or awards three of the five values for the first column 74*a*. FIG. 6 illustrates the outcome of the pick by the player 90 of the selection of Contestant B 84. The gaming device generates three selections in the indicated column. Contestant B wins three values out of the five values of the first column 74*a*. The gaming device randomly generates the five values of award level 72*a* for the columns 74*a*, 74*b*, 74*c*, 74*d*, 74*e*, and 74*f*. The gaming device randomly generates the value ten of value level 72*b* for the column 74*a*. Likewise, the gaming device randomly generates the values 50 and 100 from the award levels 72*d* and 72*e*, respectively, for the column 74*a*. The gaming device displays the value of 160 in the award meter 88 to indicate the values accumulated in the game.

Figures 7, 8:
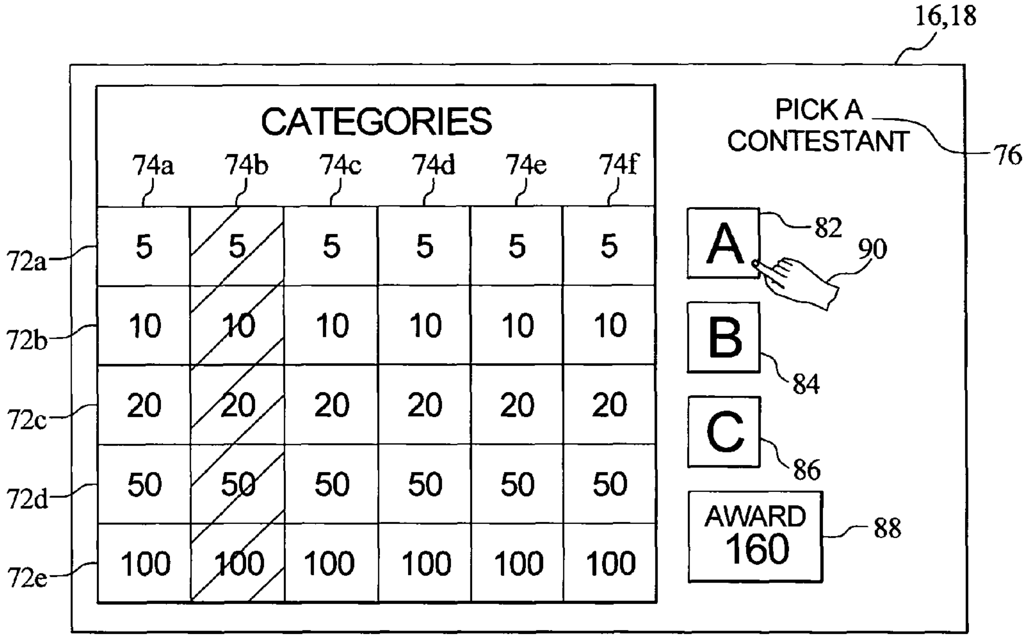
FIG. 7 is an elevation view of a display device illustrating how the gaming device indicates a column and enables the player to pick a contestant for the indicated column.
FIG. 8 is a table illustrating how in one embodiment of the present invention, the gaming device chooses from a plurality of pools to determine the outcome of the second segment of the game for each contestant.

The game continues in this manner until all or a certain number of the displayed symbol groups have been indicated and played. The gaming device indicates the second column 74*b*, as illustrated in FIG. 7. The gaming device instructs and enables the player to pick a contestant. The player picks Contestant A 82 in this round of the game. The gaming device selects another paytable.

As illustrated in FIG. 7, the gaming device highlights or indicates the next column 74*b* and instructs the player to pick a contestant. The player 90 in response picks Contestant A 84. The player may pick the same contestant or a different contestant.

As illustrated in FIG. 8, a plurality of pools are associated with Column 2. In one embodiment, a plurality of pools are associated with each column. In one embodiment of the present invention, the chances of each of the pools being employed for a particular column of the grid change each time the gaming device indicates a new column. In one embodiment, the pools and the chances or probabilities of being employed, as illustrated in FIG. 5, are associated with the first column 74*a* of the displayed grid in FIGS. 3, 4, 6, 7 and 9. In one embodiment, when the player advances to the next column, the pools remain the same but the chance of each of the pools being employed changes.

For example, the table 160 of FIG. 8 displays a table of outcomes associated with the second column 74*b* of the displayed grid of FIGS. 3, 4, 6, 7 and 9. Each of the pools has the same outcomes as pools associated with the previous column 74*a* but the chances or probabilities of each pool being employed change. That is, each pool has the same designated number of values associated with each of the contestants, but the chances of the paytable being employed change when the gaming device indicates a new column. For example, as illustrated in the table 150 of FIG. 5, in Pool 1 Contestant A is associated with five values and Contestants B and C are each associated with zero values. However, the chance of Pool 1 being employed is 10% for the second column 74*b*. For the first column 74*a*, the chance of Pool 1 being employed was 0%. Likewise, Pool 2 in the table 160 of FIG. 8 has the same outcomes of Pool 2 for the first column 74*a* as illustrated in the table 150 of FIG. 5, Contestant A is associated with four values, Contestant B is associated with one value and Contestant C is associated with zero values. However, as illustrated in the table 160 for the second column 74*b*, Pool 2 has a 10% chance of being employed in the second column. Pool 2 has a 0% chance of being employed in the game, when the player was playing the first column. This arrangement guarantees that the player receives an award in the first column but has a chance of not receiving an award in the second column, depending on which selection the player picks. The outcomes of Pools 3, 4 and 5 for the second column are all the same. However, the chances of Pools 3, 4 and 5 being employed in the second column are different than the chances of the Pools being employed in the first column 74*a*. Pool 3 has a 20% of being employed in the first column, as illustrated in the table 150 of FIG. 5. Pool 3 has a 25% chance of being as illustrated in the table 160 of FIG. 8. Pool 4 has a 40% of being employed in the first column 74*a* and a 30% chance of being employed for the second column 74*b*. Pool 5 has a 40% of being employed in the first column 74*a* and a 25% chance of being employed for the second column 74*b*.

Figure 9:
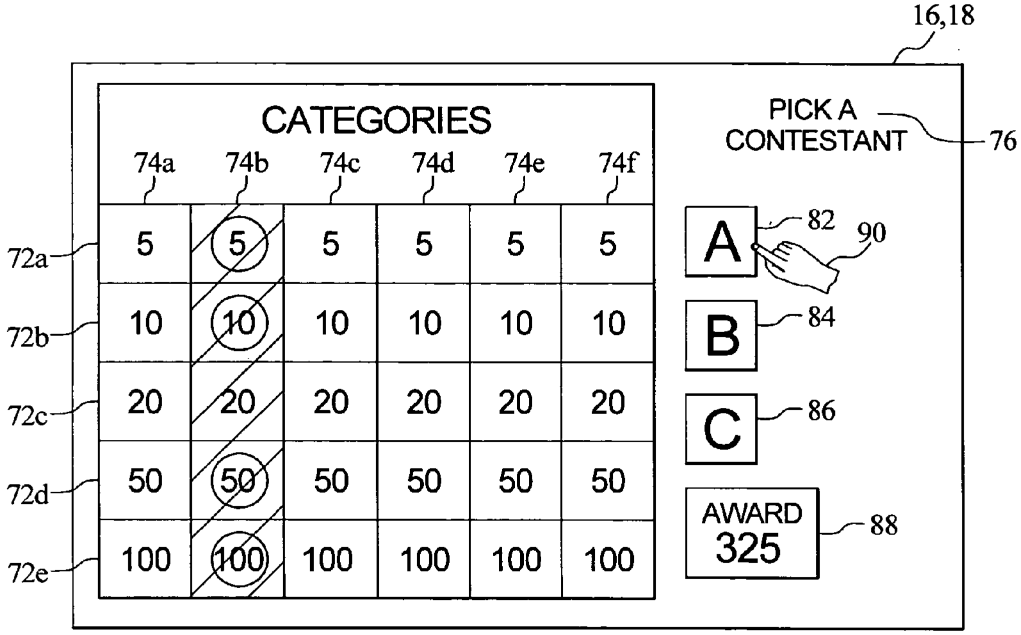
FIG. 9 is an elevation view of a display device illustrating how the gaming device indicates a column, enables the player to pick a contestant for the indicated column and generates a plurality of values based on the selected pools.

In this example, the gaming device employed Pool 2 for the second column. FIG. 9 illustrates the outcome of the pick of Contestant A 82 by the player when the gaming device selected Pool 2. Contestant A wins four out of the five values of the second column 74*b*. In particular, the gaming device 10 has randomly generated the five values of award level 72*a* for the columns 74*a* to 74*f*. The gaming device 10 has randomly generated the value five of value level 72*a* for the second column 74*b*. The gaming device 10 has randomly generated the value 10 of value level 72*b* for the second column 74*b*. Likewise, the gaming device has randomly generated the values 50 and 100 from the award levels 72*d* and 72*e*, respectively, for the second column 74*b*. The gaming device displays the value of 325 in the award meter 88 to indicate the values accumulated in the game. The value of 325 is the sum of the values awarded to the player in the first and second columns. In one embodiment, the game ends and the gaming device provides the player with the accumulated award of 325 monetary units or credits.

In one embodiment, this game continues in this manner until all or a certain number of the displayed columns have been selected and played. In one embodiment, the player is provided the same number of picks as there are columns. Although in one embodiment, the selection analysis proceeds in an orderly manner, e.g., from left to right, the display of the picks for any contestant can be done randomly in different columns, making the game appear virtually exactly the same as the true Jeopardy™ game. It should also be appreciated that the values or symbols may be negative amounts. Such as when a contestant does not get one of the questions correct on the true Jeopardy™ game. The player may be awarded these negative values as well.

The game may terminate in any suitable manner. In one embodiment, the gaming device provides the player with a certain number of picks of the selections. The game terminates when the player runs out of the provided number of picks. In one embodiment, the number of picks of the selections is based on an event or outcome in a primary or base game. In another embodiment, the gaming device randomly provides the player with a number of picks of the selections. In another embodiment, the gaming device includes a terminating event that is associated with one of the symbols. When the symbol associated with the terminating event is generated, the gaming device ends the game. In one embodiment, the game ends when each of the displayed columns or displayed symbol groups have been indicated or played. In another embodiment, the game ends when the game does not generate any of the symbols for one of the columns. In another embodiment, the game terminates after a predetermined number of symbol groups or columns are indicated and played. In another embodiment, the game ends when the gaming device generates all of the values or symbols for one of the symbol groups or columns. In another embodiment, the game begins a terminating sequence upon a game event such as the accumulated values reaching a certain amount, a certain number of symbol groups being played, a certain number of selections being picked or any other suitable game event. The terminating sequence may include playing a predetermined number of symbols groups or generating a specific number of values or symbols. It should be appreciated that the terminating sequence may be any suitable terminating sequence or event. In another embodiment, the game ends or begins a terminating sequence when a certain symbol is indicated, such as a symbol representing a Daily Double, a Double Jeopardy round or a Final Jeopardy round as in the true Jeopardy™ game. In different embodiments, the terminating event is selected from a group consisting of providing a designated number of symbols, providing a designated symbol, indicating a designated number of symbol groups, causing the at least one display device to display a designated first award, causing the at least one display device to display a second award and initiating a new round. It should be appreciated that the game may terminate the game in any suitable manner.

In one embodiment, the game includes a first round and a second round. In this embodiment, the player plays the first round as described above until a second round initiating event occurs. In one embodiment, the second round initiating event is a second round symbol. When the second round symbol is generated, the gaming device displays a second set of symbol groups and begins a new round of play. In another embodiment, the game produces a second set of symbol groups when all of the displayed symbol groups have been indicated and played. In one embodiment, the game terminates when a certain number of symbol groups have been indicated, a certain number of symbols have been generated or and played or when the player achieves a designated award amount. This can be repeated for additional rounds in accordance with the present invention.

In one embodiment, the gaming device accumulates values for each selection. In one embodiment, the gaming device includes a plurality of selections. Each time the player chooses a selection, the gaming device generates one or more values. The gaming device separately accumulates the values generated associated with each selection.

The gaming device can use any suitable way to highlight the values associated with a player's pick of one of the contestants 82 to 86. In the illustrated embodiment, the values are circled. Alternatively, the values are illuminated, morphed, provided with a color change, any combination of those methods or via any other suitable method for highlighting certain values with respect to other values.

In one embodiment of the present invention, the chances of each of the pools being employed for a particular column of the grid change each time the gaming device indicates a new column. In one embodiment, the pools and the chances or probabilities of being employed, illustrated in FIG. 8, are associated with the first column 74*a* of the displayed grid in FIGS. 4, 5 6 and 7. In one embodiment, when the player advances to the next column, the pools remain the same but the chance of each of the pools being employed changes.

In one embodiment, the chance of each outcome pool being employed remains constant for the entire game. In one embodiment, the pools change for each column. In another embodiment, the chance of each outcome pool being employed changes for each column. In one embodiment, the chance of each pool being employed changes for each of the grids. For example, the chance of each of the pools being employed remains constant for the first round of the game and then changes for the second round of the game. It should be appreciated that the pools may be randomly selected. It should also be appreciated that the pools may be chosen before the game begins or after the player picks one of the contestants.

Figure 10:
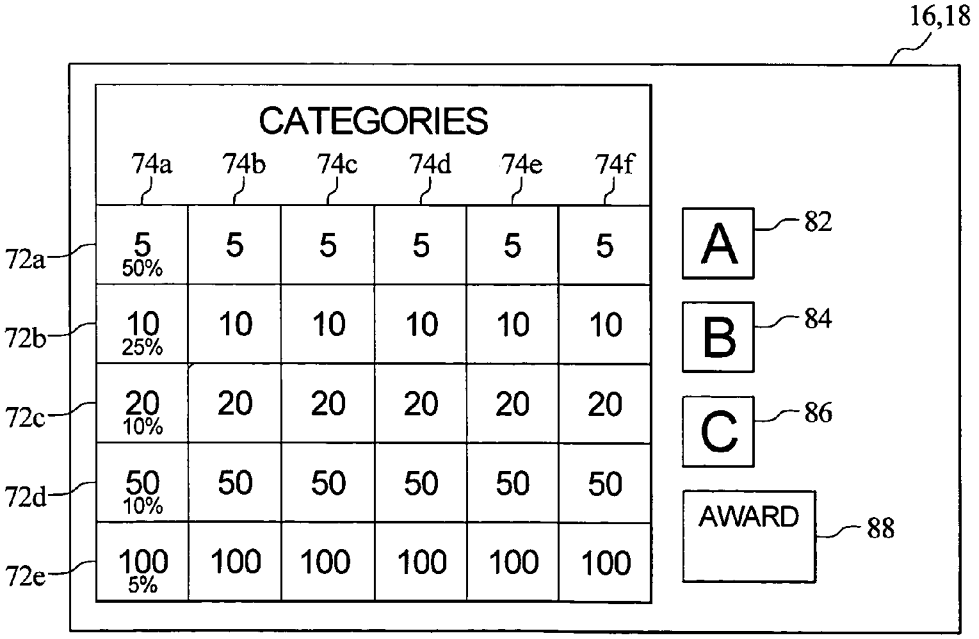
FIG. 10 is an elevation view of a display device illustrating how the gaming device generates one of a plurality of symbols in an indicated column and based on the indicated probabilities.
Figure 11:
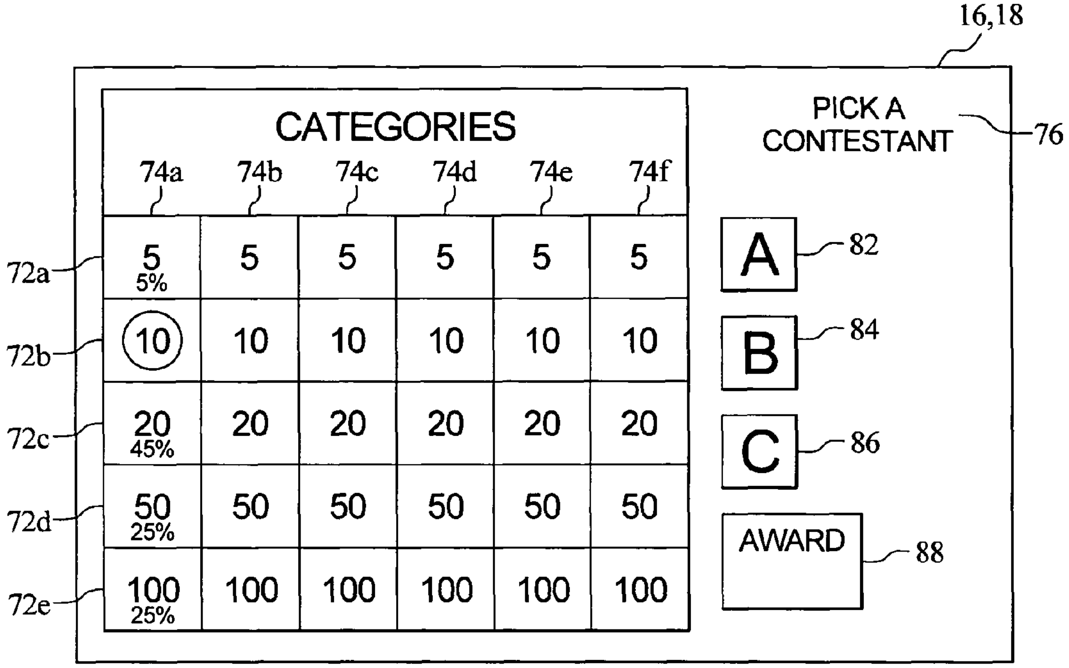
FIG. 11 is an elevation view of a display device illustrating how the gaming device generates one of a plurality of symbols in an indicated column and based on the indicated probabilities.

In one embodiment, each of the values is associated with a probability of being generated. As illustrated in FIGS. 9 and 10, the gaming device indicates the first category 74*a*. The gaming device determines based on a previous player selection and a selected pool, that the gaming device will generate two values in this indicated category. In one embodiment, the probabilities increase for each value level. That is, the probability of one of the selections of the value level 72*a* are greater than the probability of generating the value of value level 72*c*. In another embodiment, the probabilities are random and are not based on the values. Each of the values is associated with a probability of being indicated. For example, the 5 value is associated with a 50% probability of being generated. The 10 value in the first column 74*a* is associated with a 25%. The gaming device indicates the 10 value of the first column 74*a*. The gaming device has another value to generate in the indicated column because it determined that two values would be generated. Therefore, new probabilities are assigned to each of the unselected or ungenerated values. The five value now has a 5% probability of being generated. The 20 now has a 45% probability of being generated. It should be appreciated that the probabilities may be determined in any suitable manner. In one embodiment, once the gaming device has generated one of the values, the values which are lower in number have a 0% chance of being generated.

In another embodiment, the symbols in each group are each associated with a probability. In this embodiment, when one of the symbols in that group is indicated, the probabilities associated with the non-indicated symbols do not change. Rather the ratio of the probabilities changes. The probability associated with the indicated section is excluded from the ratio of the probabilities, thus changing the probability of each of the non-generated symbols. For example, a symbol group includes four symbols. Initially each of the sections has a 25/100 or 25% probability of being generated. When one of the symbols is generated, the probability associated with the generated is taken out of the denominator of the ratio. Thus, when one of the symbols is generated, each of the other symbols has a 25/75 probability of being indicated. Likewise, after two of the symbols have been generated each of the two remaining symbols has a 25/50 probability of being generated. It should be appreciated that any other suitable method of determining which symbols to generate may be employed in the present invention.

In one embodiment, the probabilities associated with each symbol are associated with the awards. In one embodiment, smaller values or smaller awards have a higher probability of being generated than larger awards. In one embodiment, the probabilities are randomly determined. In another embodiment, as the values increase the probability of being generated associated with each of the values decrease. In one embodiment, the probabilities of generating a higher award increase after more of the symbol groups or played are indicated.

In another embodiment of the present invention, the game includes two segments. The first segment of the game includes an initial or first award amount. The second segment of the game enables the player to wager all, part or none of the first amount. In one embodiment, the player play a third segment of the game or a different second game with the values received from the second segment of the game. The player receives a first award amount in a first game or the first segment of the game. The player has the opportunity to wager none, all or a certain amount of the first award amount in the second segment of the game. The amount the player chooses to wager in the second segment of the game is the wager amount and the other part of the first award amount is the saved award amount. After the player chooses the wager amount, the gaming device enables the player to select a modifier. In one embodiment, the display device displays a plurality of player selectable selections and each of the selections are associated with award modifiers. After the player picks one of the selections, the gaming device modifies the wager amount by the award modifier associated with the picked selection. This amount is the second award amount.

In one embodiment, the gaming device awards the player an outcome which includes the saved award amount and the second award amount. In another embodiment, the gaming device initiates a game after the modification of the wager amount. The results of this game determine if the player will win or lose the second wager amount. If the player wins the game, the gaming device provides the player an outcome which includes the saved award amount and the second award amount. In one embodiment, if the player loses the game, the gaming device provides the player with an outcome of the saved award amount.

Figure 12:
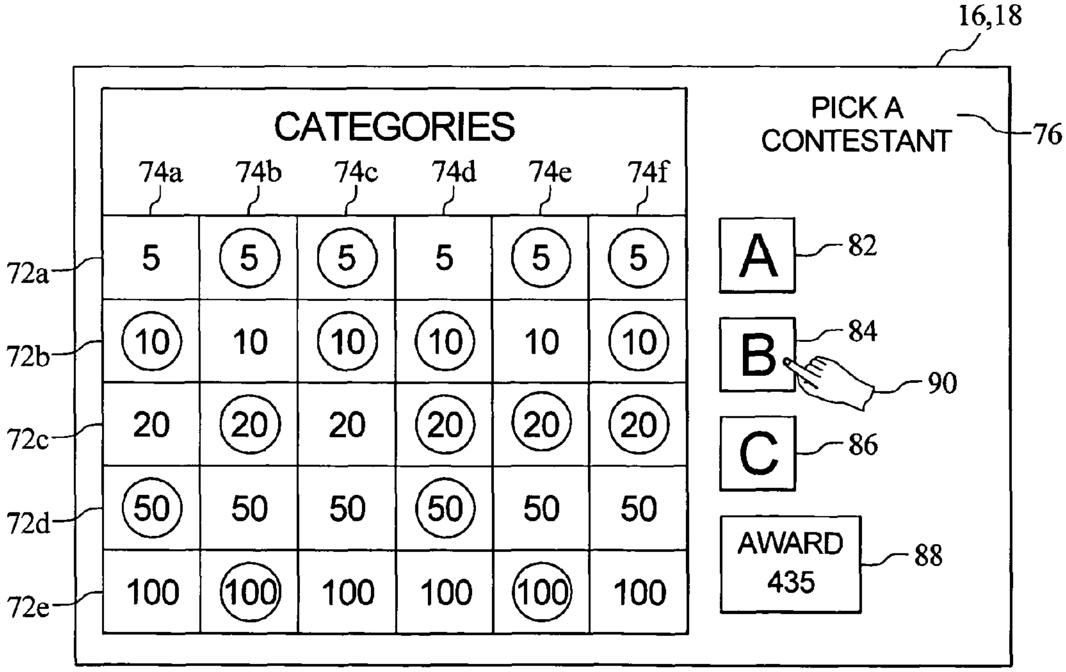
FIG. 12 is an elevation view of a display device illustrating a plurality of outcomes from one embodiment of the present invention.

As illustrated in FIG. 12, in one embodiment, the first segment or the first game is played according to the Jeopardy theme described above. It should be appreciated that the first segment or the first game may be any suitable game. Each of the columns 74*a* to 74*f* is played by the player picking Contestant A 82, Contestant B 84 or Contestant C 86 for each of the columns. All of the values awarded to the player are accumulated and displayed in the award meter 88. In this example, the player has an award of 440. The award meter 88 displays the value of 440.

Figure 13:
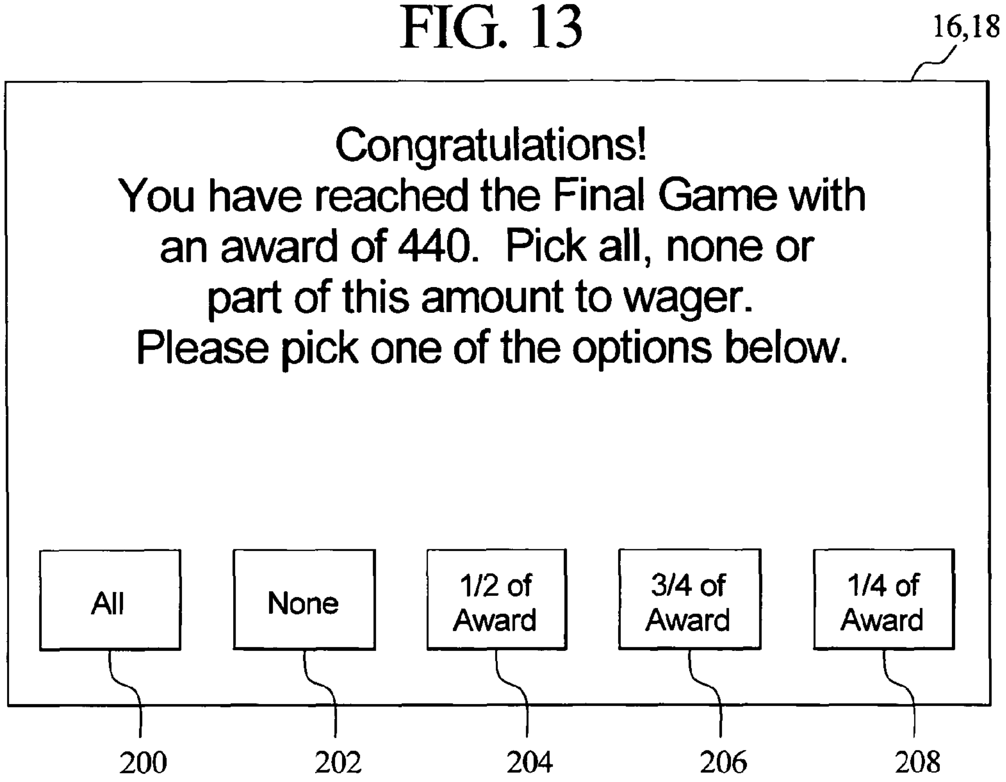
FIG. 13 is an elevation view of a display device illustrating the gaming device enabling the player to wager none, all or part of the award from the first game segment.

The display device then displays the second segment of the game to the player, as illustrated in FIG. 13. The gaming device instructs the player to pick an amount of the award to wager in the final game. In one embodiment, the gaming device displays a plurality of player selectable selections 200, 202, 204, 206, 208 which correspond to amounts of the wager. Selection 200 enables the player to wager the entire first award amount. Selection 202 enables the player to wager none of the first award amount. Selection 204 enables the player to wager ½ of the first award amount. Selection 206 enables the player to wager ¾ of the first award amount. Selection 208 enables the player to wager ¼ of the first award amount. In an alternative embodiment (not illustrated), the gaming device enables the player to input the exact amount of the wager for the second game segment. For example, the gaming device enables the player to enter any numerical amount up until the total amount of the first award amount.

Figure 14:
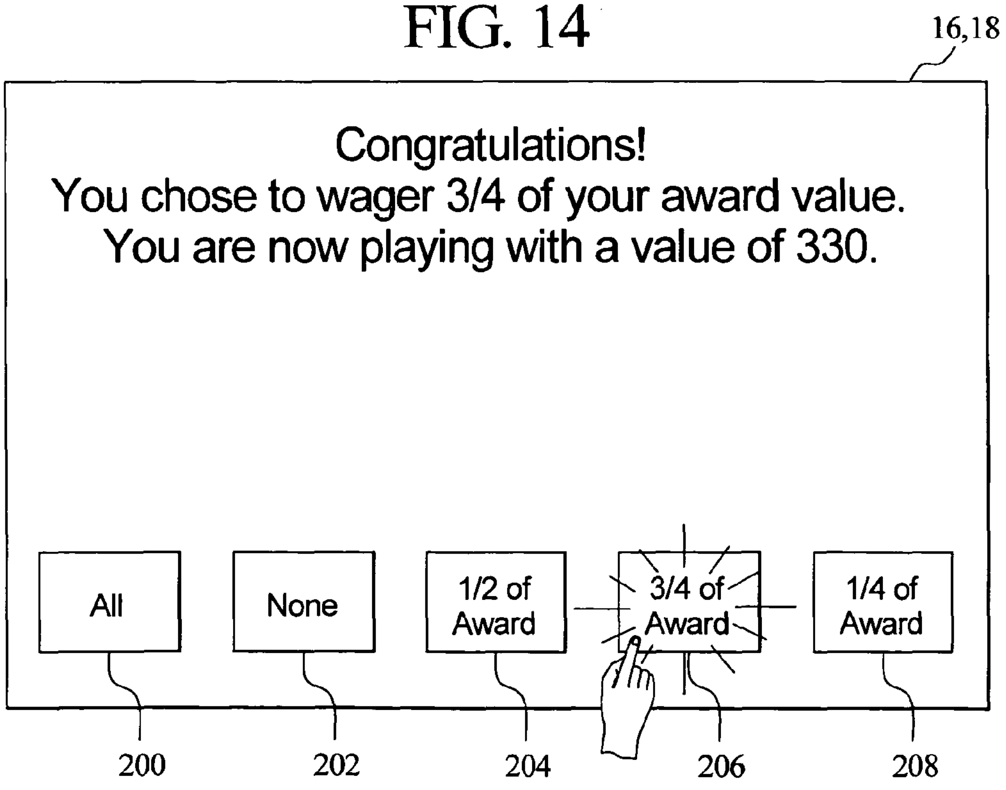
FIG. 14 is an elevation view of a display device illustrating a player's selection to wager part of the first award amount

As illustrated in FIG. 14, in one embodiment, the player picks the selection 206 corresponding to ¾ of the first award amount. That is, in the second segment of the game, the player is playing with a value of 330 credits, which is ¾ of the first award amount. These 330 credits are the wager amount. The player will be awarded the 110 credits not wagered in the final game when the game ends.

Figure 15:
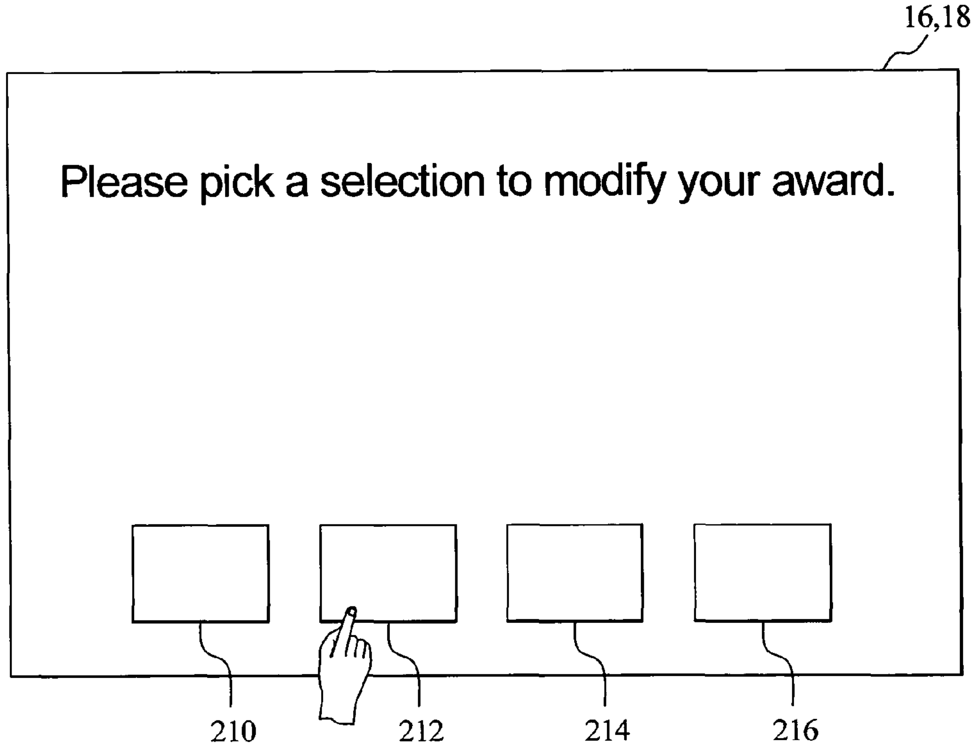
FIG. 15 is an elevation view of a display device illustrating the player's selection of one of a masked selection.

As illustrated in FIG. 15, the display device displays a plurality of masked player selectable selections 210, 212, 214 and 216. Each of these selections corresponds to or is associated with an award modifier. The award modifiers include but are not limited to lose ½, lose ¼, lose ¾, lose all and multipliers such as values of 1×, 2×, 3× and so forth.

As illustrated in FIG. 15, the player is instructed to pick one of the selections to modify the wager amount. In this example, the player picks a selection 212.

Figure 16:
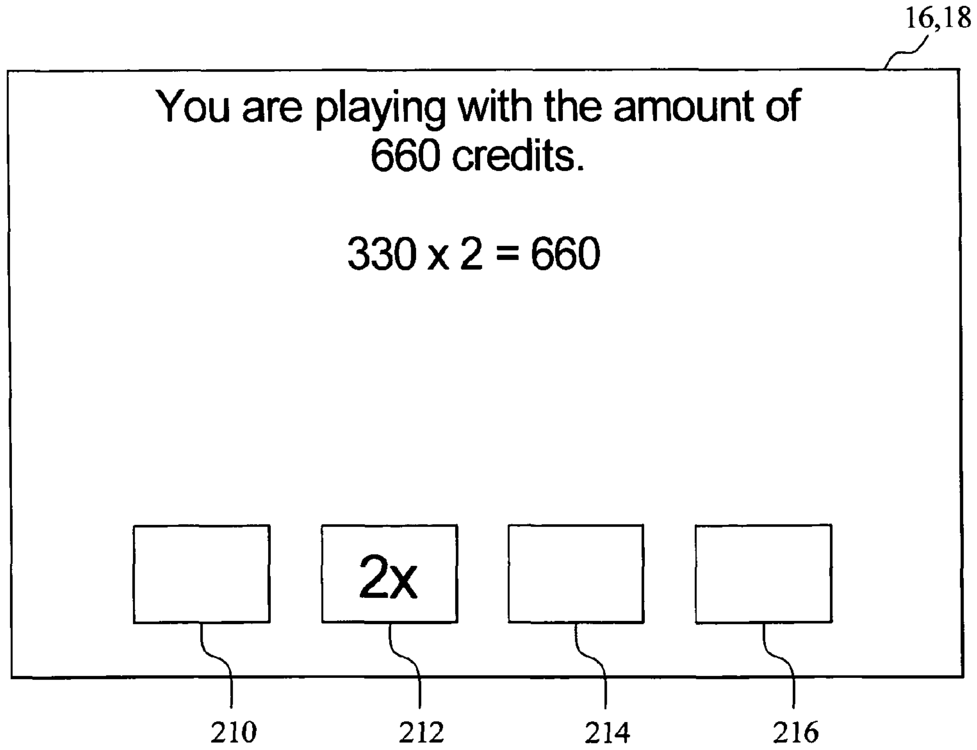
FIG. 16 is an elevation view of a display device illustrating the multiplier associated with the player's picked selection.

As illustrated in FIG. 16, the display device displays a value of 2× in the picked selection 212. The gaming device multiplies the wager amount by 2. The player has a second award amount of 660.

In one embodiment, the game ends and the gaming device awards the player the saved first award amount of 110 and the second award amount of 660, or 770.

In alternative embodiments, 660 represents another type of value, such as a multiplier of gaming device credits, a number of picks from a prize pool, a number of free games, a number of free spins, a non-monetary award or other suitable award.

Figure 17:
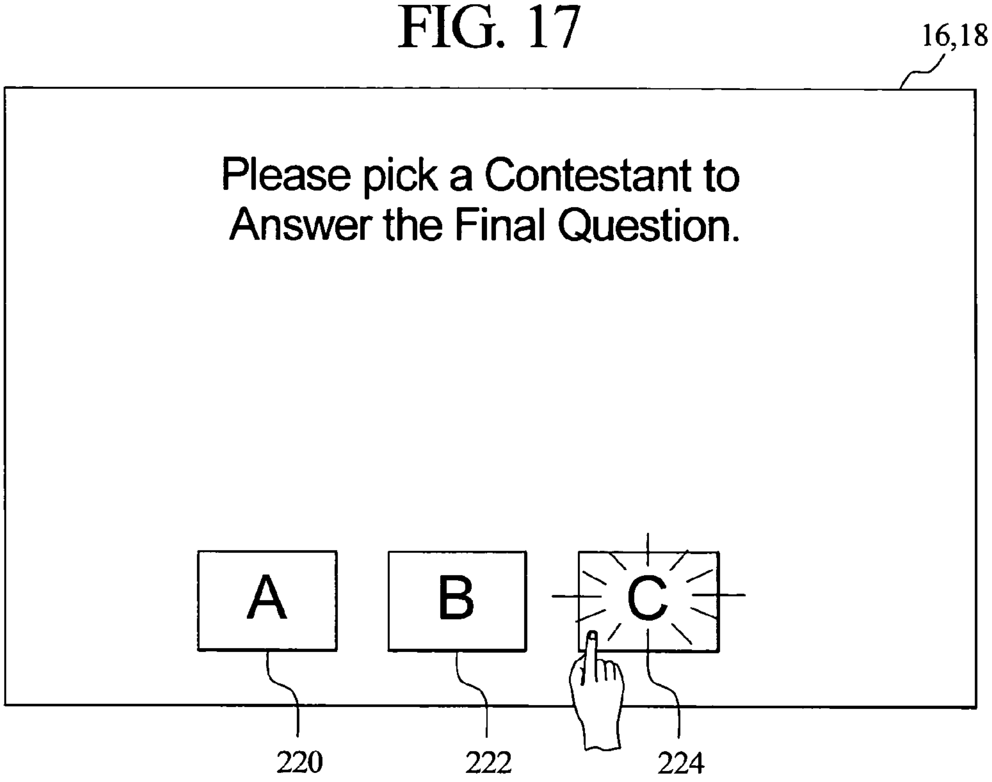
FIG. 17 is an elevation view of a display device illustrating a third game segment of one embodiment of the present invention.
Figure 18:
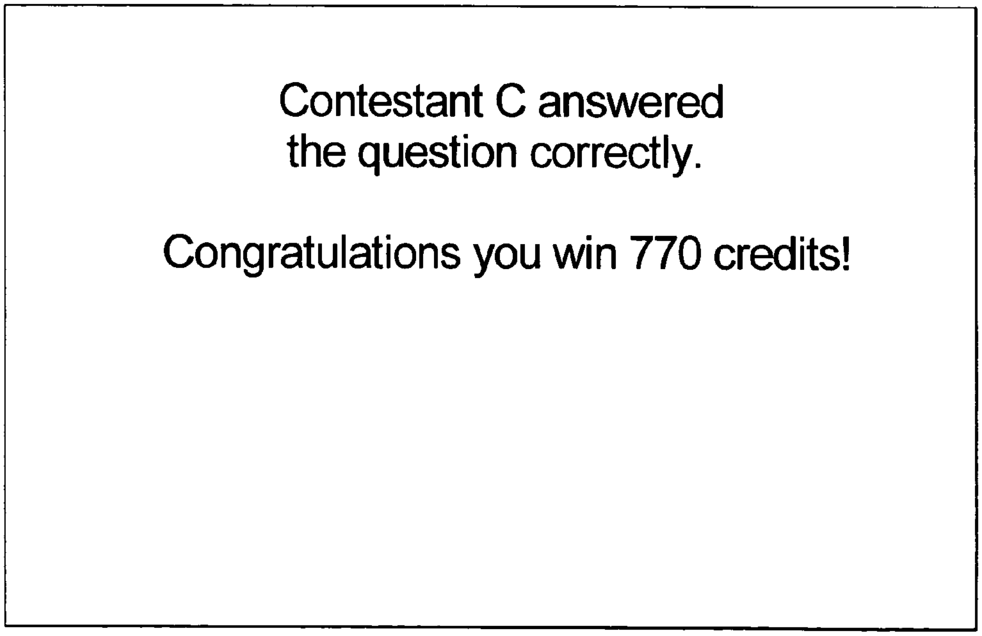
FIG. 18 is an elevation view of a display device illustrating a game outcome of one embodiment of the present invention.

In one embodiment, as illustrated in FIG. 17, the display device displays Contestant A 220, Contestant B 222, and Contestant C 224 and instructs the player to pick a contestant for the final round. The player picks Contestant C 224.

The gaming device randomly determines if the player will win or lose the second award amount. As illustrated in FIG. 17, in this example, the gaming device randomly determines that the player will win the second award amount. The gaming device notifies the player that they won the second wager amount. The player wins the saved award amount from the initial wager plus the new amount. The gaming device provides the player with an outcome of 770 credits or monetary units, the sum of the saved award amount and the second award amount.

It should be appreciated that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of operating a gaming device, said method comprising:

(a) defining a first set of symbol groups and a second set of symbol groups, wherein each of the sets includes a plurality of symbol groups and each of the symbol groups includes a plurality of symbols; and (b) causing at least one processor to execute a plurality of instructions stored in at least one memory device to operate with at least one display device and at least one input device to:

(i) receive a monetary wager for a play of a wagering game from a player;

(ii) after receiving the monetary wager from the player, display each of the symbol groups of said first set of symbol groups;

(iii) after displaying the symbol groups of the first set of symbol groups, display a designation of one of the displayed symbol groups of the first set of symbol groups;

(iv) after displaying the designation of one of the displayed symbol groups of the first set of symbol groups, determine one of a plurality of different quantities of the displayed symbols to designate from the designated displayed symbol group;

(v) after determining the quantity of the displayed symbols to designate from the designated displayed symbol group, display a designation of said determined quantity of the displayed symbols from said designated displayed symbol group;

(vi) unless a second set initiating event occurs in association with the first set of displayed symbol groups:

(A) repeat (iii) to (v) at least once for a different one of the displayed symbol groups not previously designated from the first set of symbol groups;

(B) display a first award to the player, wherein said first award is based on each of the determined quantity of the designated displayed symbols of the first set of symbol groups; and (C) cause said first award to be provided to the player;

(vii) if the second set initiating event occurs in association with the first set of displayed symbol groups:

(A) display each of the symbol groups of the second set of symbol groups, wherein a plurality of the displayed symbols in the second set of symbol groups are different than a plurality of the displayed symbols in the first set of symbol groups;

(B) display a designation of one of the displayed symbol groups of the second set of symbol groups;

(C) after displaying the designation of one of the displayed symbol groups of the second set of symbol groups, determine one of a plurality of different quantities of the displayed symbols to designate from the designated displayed symbol group;

(D) after determining the quantity of the displayed symbols to designate from the designated displayed symbol group, display a designation of said determined quantity of displayed symbols of said designated displayed symbol group; and (E) unless a terminating event occurs in association with the second set of symbol groups:

(1) repeat (B) to (D) at least once for a different one of the symbol groups of the second set of symbol groups;

(2) display a second award to the player, wherein said second award is based on each of the determined quantity of said designated displayed symbols of the second set of symbol groups; and (3) cause said second award to be provided to the player; and (viii) if the terminating event occurs in association with the second set of symbol groups:

(A) enable the player to risk an amount including at least part of any displayed first award and any displayed second award;

(B) determine an outcome based, at least in part, on said amount risked by the player; and (C) cause said determined outcome to be provided to the player.

2. The method of claim 1, wherein a plurality of the symbols are numerical values.

3. The method of claim 1, which includes selecting the terminating event from a group consisting of: designating a designated quantity of the displayed symbols from the designated displayed symbol group, designating a designated one of the displayed symbols, designating a designated number of the displayed symbol groups, providing the player with a designated first award, providing the player with a designated second award, and initiating a new round.

4. The method of claim 1, which includes associating a plurality of the symbols of the first and second symbol sets with one of a plurality of probabilities and basing said determinations on the associated probabilities.

5. The method of claim 1, which includes providing a plurality of outcome pools which each include a plurality of the different quantities, each one of the different quantities indicating how many of the displayed symbols to designate from the designated displayed symbol group, selecting one of the outcome pools, and using the selected outcome pool to determine how many of the displayed symbols to designate from the designated displayed symbol group.

6. The method of claim 1, which includes enabling the player to pick one of a plurality of selections after displaying the designation of one of the displayed symbol groups, and causing the at least one processor to execute the plurality of instructions to determine which one of the plurality of different quantities of displayed symbols to designate from the designated displayed symbol group based, at least in part, on the picked selection.

7. The method of claim 6, which includes providing a plurality of outcome pools which each include a plurality of the different quantities, each one of the different quantities indicating how many of the displayed symbols to designate from the designated displayed symbol group, selecting one of the outcome pools, and randomly associating the different quantities of the selected outcome pool with the selections to determine how many of the displayed symbols to designate from the designated displayed symbol group.

8. The method of claim 7, which includes enabling the player to pick one of a plurality of selections and modifying the amount risked based, at least in part, on the picked selection if the terminating event occurs in association with the second set of symbol groups.

9. The method of claim 1, which includes selecting the second set initiating event from a group consisting of: designating a designated quantity of the displayed symbols from the designated displayed symbol group, designating a designated one of the displayed symbols, designating a designated number of the symbol groups, providing the player with a designated first award, providing the player with a designated second award, and initiating a new round.

10. The method of claim 1, which is provided through a data network.

11. The method of claim 10, wherein the data network is an internet.

12. A method of operating a gaming device, said method, comprising:

(a) defining a first set of symbol groups and a second set of symbol groups, wherein each of the sets includes a plurality of symbol groups and each of the symbol groups includes a plurality of symbols; and (b) causing at least one processor to execute a plurality of instructions stored in at least one memory device to operate with at least one display device and at least one input device to:

(i) receive a monetary wager for a play of a wagering same from a player;

(ii) after receiving the monetary wager from the player, display each of the symbol groups of said first set of symbol groups;

(iii) after displaying the symbol groups of the first set of symbol groups, display a designation of one of the displayed symbol groups of the first set of symbol groups;

(iv) after displaying the designation of one of the displayed symbol groups of the first set of symbol groups, determine one of a plurality of different quantities of the displayed symbols to designate from the designated displayed symbol group;

(v) after determining the quantity of the displayed symbols to designate from the designated displayed symbol group, display a designation of said determined quantity of the displayed symbols from said designated displayed symbol group;

(vi) unless a second set initiating event occurs in association with the first set of displayed symbol groups:

(A) repeat (iii) to (v) at least once for a different one of the displayed symbol groups not previously designated from the first set of symbol groups;

(B) display a first award to the player, wherein said first award is based on each of the determined number of the designated displayed symbols of said first set of symbol groups; and (C) cause said first award to be provided to the player; and (vii) if the second set initiating event occurs in association with the first set of displayed symbol groups:

(A) display each of the symbol groups of the second set of symbol groups, wherein a plurality of symbols in the second set of symbol groups are different than a plurality of the symbols in the first set of symbol groups;

(B) display a designation of one of the displayed symbol groups of the second set of symbol groups;

(C) after displaying the designation of one of the displayed symbol groups of the second set of symbol groups, determine one of a plurality of different quantities of the displayed symbols to designate from the designated displayed symbol group;

(D) after determining the quantity of the displayed symbols to designate from the designated displayed symbol group, display a designation of said determined quantity of the displayed symbols of said designated displayed symbol group; and (E) unless a terminating event occurs in association with the second set of symbol groups:

(1) repeat (B) to (D) at least once for a different one of the displayed symbol groups of the second set of symbol groups;

(2) display a second award based on any designated symbols of said second symbol group; and (3) cause said second award to be provided to the player.

13. The method of claim 12, wherein a plurality of the symbols are numerical values.

14. The method of claim 12, which includes selecting the second set initiating event from a group consisting of: designating a designated quantity of the displayed symbols from the designated displayed symbol group, designating a designated one of the displayed symbols, designating a designated number of the displayed symbol groups, providing the player with a designated first award, providing the player with a designated second award, and initiating a new round.

15. The method of claim 12, which includes associating a plurality of the symbols of the first and second symbol sets with one of a plurality of probabilities and basing said determinations on the associated probabilities.

16. The method of claim 12, which includes enabling the player to pick one of a plurality of selections after displaying the designation of one of the symbol groups of the first or second set, and causing the at least one processor to execute the plurality of instructions to determine which one of the plurality of different quantities of the symbols to designate from the designated displayed symbol group based, at least in part, on the picked selection.

17. The method of claim 16, which includes providing a plurality of outcome pools which each include a plurality of the different quantities, each one of the different quantities indicating how many of the displayed symbols to designate from the designated displayed symbol group, selecting one of the outcome pools, and randomly associating the different quantities of the selected outcome pool with the selections to determine how many of the displayed symbols to designate from the designated displayed symbol group.

18. The method of claim 12, which includes providing a plurality of outcome pools which each include a plurality of the different quantities, each one of the different quantities indicating how many of the displayed symbols to designate from the designated displayed symbol group, selecting one of the outcome pools, and using the selected outcome pool to determine how many of displayed symbols to designate from the designated displayed symbol group.

19. The method of claim 12, which is provided through a data network.

20. The method of claim 19, wherein the data network is an internet.

21. A method of operating a gaming device said method comprising:

(a) causing at least one processor to execute a plurality of instructions stored in at least one memory device to operate with at least one display device and at least one input device to:

(i) receive a monetary wager for a play of a wagering game from a player;

(ii) after receiving the monetary wager from the player, display a plurality of symbol groups, each symbol group including a plurality of symbols;

(iii) after displaying the symbol groups, display a designation of one of the displayed symbol groups;

(iv) after displaying the designation of one of the displayed symbol groups determine one of a plurality of different quantities of the displayed symbols to designate from the designated displayed symbol group;

(v) after determining the quantity of the displayed symbols to designate from the designated displayed symbol group, display a designation of said determined quantity of the displayed symbols from said designated displayed symbol group;

(vi) repeat (iv) to (v) at least once for a different one of the displayed symbol groups not previously designated;

(vii) display an award based on each of the determined quantity of the designated displayed symbols;

(viii) cause said displayed award to be provided to the player; and (ix) if a terminating event occurs in association with the displayed plurality of symbol groups:

(A) enable the player to risk an amount including at least part of the displayed award;

(B) determine a second award based, at least in part, on said amount risked by the player; and (C) cause the second award to be provided to the player.

22. The method of claim 21, wherein a plurality of the symbols are numerical values.

23. The method of claim 21, which includes selecting the terminating event from a group consisting of: designating a designated quantity of the displayed symbols from the designated displayed symbol group, designating a designated one of the displayed symbols, designating a designated number of the displayed symbol groups, providing the player with a designated first award, providing the player with a designated second award, and initiating a new round.

24. The method of claim 21, which includes associating a plurality of the symbols of each of the symbol groups with one of a plurality of probabilities and basing said determination on the associated probabilities.

25. The method of claim 21, which includes enabling the player to pick one of a plurality of selections after the designation of one of the symbol groups, and causing the at least one processor to execute the plurality of instructions to determine which one of the plurality of different quantities of the displayed symbols to designate from the designated displayed symbol group based, at least in part, on the picked selection.

26. The method of claim 25, which includes providing a plurality of outcome pools which each include a plurality of the different quantities, each one of the different quantities indicating how many of the displayed symbols to designate from the designated displayed symbol group, selecting one of the outcome pools, and randomly associating the numbers of the selected outcome pool with the selections to determine how many of the displayed symbols to designate from the designated displayed symbol group.

27. The method of claim 21, which includes providing a plurality of outcome pools which each include a plurality of the different quantities, each one of the different quantities indicating how many of the displayed symbols to designate from the designated displayed symbol group, selecting one of the outcome pools, and using the selected outcome pool to determine how many of the displayed symbols to designate from the designated displayed symbol group.

28. The method of claim 21, which includes enabling the player to pick one of a plurality of selections and modifying the amount risked based, at least in part, on the picked selection if the terminating event occurs.

29. The method of claim 28, which includes associating each of the selections with one of a plurality of modifiers and modifying the amount risked by the modifier associated with the picked selection if the terminating event occurs.

30. The method of claim 21, which is provided through a data network.

31. The method of claim 30, wherein the data network is an internet.

32. A method of operating a gaming device said, comprising:

(a) defining a plurality of symbol sets, each of said plurality of symbol sets including a plurality of symbol groups, wherein each of said plurality of symbol groups includes a plurality of symbols;

(b) causing at least one processor to execute a plurality of instructions stored in at least one memory device to operate with at least one display device and at least one input device to:

(i) receive a monetary wager for a play of a wagering game from a player;

(ii) after receiving the monetary wager from the player, display each of the symbol groups of a first one of the symbol sets;

(iii) after displaying the symbol group of the first symbol set, select one of the displayed symbol groups of the first symbol set;

(iv) after selecting one of the displayed symbol groups of the first symbol set, determine one of a plurality of different quantities of the displayed symbols from said selected displayed symbol group to provide to the player;

(v) after determining the quantity of the displayed symbols to designate from the selected displayed symbol group, provide said determined quantity of the displayed symbols from said selected displayed symbol group;

(vi) when a second symbol set initiating event occurs:

(A) display each of the symbol groups of a second one of the symbol sets, wherein a plurality of symbols in said second symbol set are different from a plurality of symbols in said first symbol set;

(B) after displaying the symbol group of the first symbol set, select one of the displayed symbol groups of the second symbol set;

(C) after selecting one of the displayed symbol groups of the first symbol set, determine a quantity of displayed symbols from said selected displayed symbol group to provide to the player;

(D) provide said determined quantity of the displayed symbols from said selected displayed symbol group; and (E) repeat (B) to (D) at least once for a different one of the displayed symbol groups not previously selected;

(vii) repeat (iii) to (v) at least once unless a terminating event occurs; and (viii) if the terminating event occurs:

(A) determine an award based on any symbols provided to the player; and (B) enable the player to risk at least part of the determined award; and (c) causing the at least one processor to execute the plurality of instructions stored in at least one memory device to cause a final award to be provided to the player, the final award being based on any provided symbols and based on any amount risked by the player.

33. The method of claim 32, wherein a plurality of the symbols are numerical values.

34. The method of claim 32, which includes selecting the terminating event from a group consisting of: providing a designated quantity of the displayed symbols from the selected displayed symbol group, providing a designated one of the displayed symbols, selecting a designated number of the displayed symbol groups, causing the at least one display device to display a designated first award, causing the at least one display device to display a designated second award, and initiating a new round.

35. The method of claim 32, which includes associating a plurality of the symbols of the first and second symbol sets with one of a plurality of probabilities and basing said determinations on the associated probabilities.

36. The method of claim 35, which includes providing a plurality of outcome pools which each include a plurality of the different quantities, each one of the different quantities indicating how many of the displayed symbols to provide from the selected displayed symbol group, selecting one of the outcome pools, and using the selected outcome pool to determine how many of the displayed symbols to provide from the selected displayed symbol group.

37. The method of claim 32, which includes enabling the player to pick one of a plurality of selections after the selection of one of the displayed symbol groups, and causing the at least one processor to execute the plurality of instructions to determine which one of the plurality of different quantities of displayed symbols to provide from the selected displayed symbol group based, at least in part, on the picked selection.

38. The method of claim 37, which includes providing a plurality of outcome pools which each include a plurality of the different quantities, each one of the different quantities indicating how many of the displayed symbols to provide from the selected displayed symbol group, selecting one of the outcome pools, and randomly associating the different quantities of the selected outcome pool with the selections to determine how many of the displayed symbols to provide from the selected displayed symbol group.

39. The method of claim 32, which includes enabling the player to pick one of a plurality of selections and modifying the amount risked based, at least in part, on the picked selection.

40. The method of claim 32, which includes selecting the second set initiating event from a group consisting of: providing a designated-quantity of the displayed symbols from the selected displayed symbol group, providing a designated one of the displayed symbols, selecting a designated number of the symbol groups, causing the at least one display device to display a designated first award, causing the at least one display device to display a designated second award, and initiating a new round.

41. The method of claim 32, which is provided through a data network.

42. The method of claim 41, wherein the data network is an internet.

43. A method of operating, a gaming device, said method comprising:

(a) defining a plurality of symbol sets, each of said plurality of symbol sets including a plurality of symbol groups, wherein each of said plurality of symbol groups includes a plurality of symbols;

(b) causing at least one processor to execute a plurality of instructions stored in at least one memory device to operate with at least one display device and at least one input device to:

(i) receive a monetary wager for a play of a wagering game from a player;

(ii) after receiving the monetary wager from the player, display each of the symbol groups of a first one of the symbol sets;

(iii) after displaying the symbol groups of the first symbol set, display a designation of one of the displayed symbol groups of the first symbol set;

(iv) after displaying the designation of one of the displayed symbol groups of the first symbol set, determine one of a plurality of quantities of displayed symbols from said designated displayed symbol group to provide to the player;

(v) after determining the quantity of the displayed symbols to designate from the designated displayed symbol group, display a designation of said determined quantity of the displayed symbols from said designated displayed symbol group;

(vi) if a second symbol set initiating event occurs:

(A) display each of the symbol groups of a second one of the symbol sets, wherein a plurality of symbols in said second symbol set are different from a plurality of symbols in said first symbol set;

(B) after displaying the symbol groups of the second symbol set, display a designation of one of the displayed symbol groups of the second symbol set;

(C) after displaying the designation of one of the displayed symbol groups of the second symbol set, determine a quantity of the displayed symbols from said designated displayed symbol group to provide to the player;

(D) after determining the quantity of the displayed symbols to designate from the designated displayed symbol group, designation of said determined quantity of the displayed symbols from said designated displayed symbol group; and (E) repeat (B) to (D) at least once unless a terminating event occurs; and (vii) repeat (iii) to (v) at least once for a different one of the displayed symbol groups not previously designated; and (c) causing at least one processor to execute a plurality of instructions stored in at least one memory device to cause a final award to be provided to the player, the final award being based on any symbols provided to the player.

44. The method of claim 43, which includes enabling the player to risk an amount including at least part of the determined award if the terminating event occurs.

45. The method of claim 44, which includes, if the terminating event occurs, causing the final award to be based on the amount risked by the player in addition to being based on the symbols provided to the player.

46. The method of claim 43, wherein a plurality of the symbols are numerical values.

47. The method of claim 43, which includes selecting the second set initiating event from a group consisting of: providing a designated quantity of the displayed symbols from the designated displayed symbol group, providing a designated one of the displayed symbols, providing a designated number of the displayed symbol groups, causing the at least one display device to display a designated first award, causing the at least one display device to display a designated second award, and initiating a new round.

48. The method of claim 43, which includes associating a plurality of the symbols of the first and second symbol sets with one of a plurality of probabilities and basing said determinations on the associated probabilities.

49. The method of claim 43, which includes enabling the player to pick one of a plurality of selections after displaying the designation of one of the symbol groups of the first or second set, and causing the at least one processor to execute the plurality of instructions to determine which one of the plurality of different quantities of the displayed symbols to provide based, at least in part, on the picked selection.

50. The method of claim 43, which includes selecting the terminating event from a group consisting of: providing a designated-quantity of the displayed symbols from the designated displayed symbol group, providing a designated one of the displayed symbols, providing a designated number of the displayed symbol groups, causing the at least one display device to display a designated first award, causing the at least one display device to display a designated second award, and initiating a new round.

51. The method of claim 43, which is provided through a data network.

52. The method of claim 51, wherein the data network is an internet.

* * * * *

UNITED STATES PATENT AND TRADEMARK OFFICE

CERTIFICATE OF CORRECTION

PATENT NO. : 7,887,409 B2
APPLICATION NO. : 10/953829
DATED : February 15, 2011
INVENTOR(S) : Baerlocher et al.

It is certified that error appears in the above-identified patent and that said Letters Patent is hereby corrected as shown below:

In Claim 12, column 22, line 52, replace “same” with --game--.

In Claim 32, column 25, line 55, replace “group” with --groups--.

In Claim 43, column 28, line 3, before “designation” insert --display a--.

Signed and Sealed this
Nineteenth Day of April, 2011

David J. Kappos
*Director of the United States Patent and Trademark Office*